(12) United States Patent
Bajema et al.

(10) Patent No.: US 8,469,633 B2
(45) Date of Patent: Jun. 25, 2013

(54) VESSEL WITH ABANDONING AND RECOVERING SYSTEM FOR PIPELINES, METHOD, AND USE OF SAID VESSEL AND SYSTEM

(75) Inventors: Eugene Alexander Bajema, Katwijk a/d Rijn (NL); Walter Petrus Johannes Wassenaar, The Hague (NL)

(73) Assignee: Heerema Marine Contractors Nederland B.V., Leiden (NL)

( * ) Notice: Subject to any disclaimer, the term of this patent is extended or adjusted under 35 U.S.C. 154(b) by 275 days.

(21) Appl. No.: 12/993,878

(22) PCT Filed: May 28, 2008

(86) PCT No.: PCT/NL2008/000138
§ 371 (c)(1),
(2), (4) Date: Nov. 22, 2010

(87) PCT Pub. No.: WO2009/145607
PCT Pub. Date: Dec. 3, 2009

(65) Prior Publication Data
US 2011/0070029 A1  Mar. 24, 2011

(51) Int. Cl.
*F16L 1/12* (2006.01)
*F16L 1/16* (2006.01)

(52) U.S. Cl.
USPC ...... 405/166; 405/154.1; 405/158; 405/168.3

(58) Field of Classification Search
USPC ............... 405/166, 173, 154.1, 158, 168.3, 405/184.4
See application file for complete search history.

(56) References Cited

U.S. PATENT DOCUMENTS

| 4,269,540 A * | 5/1981 | Uyeda et al. ............... 405/168.3 |
| 6,361,250 B1 | 3/2002 | de Varax |

FOREIGN PATENT DOCUMENTS

| EP | 1 265 017 A1 | 11/2002 |
| FR | 2 773 603 | 7/1999 |
| WO | 01/07812 A1 | 2/2001 |
| WO | WO 2009/082191 | * 7/2009 |

* cited by examiner

*Primary Examiner* — John Kreck
*Assistant Examiner* — Carib Oquendo
(74) *Attorney, Agent, or Firm* — Hoffman & Baron, LLP

(57) ABSTRACT

A vessel (1) for laying a pipeline (2), comprising a tower (3) which comprises a firing line (4) and is connected to the vessel by a hinge assembly (5) comprising a tower pivot axis (6), wherein: the tower is pivotable relative to the vessel about the tower pivot axis, during pipelaying the tower comprises an upper end and a lower end and the pipeline moves relative to the vessel along the firing line in a laying direction from the upper end towards the lower end, and the tower pivot axis is located at a distance D1 from said upper end as viewed in the laying direction, a system for abandoning and recovering the pipeline, wherein: the system comprises at least one line for lowering and raising a member configured to be connected to the pipeline, and the at least one line is supported by the hinge assembly and/or by the tower at a distance of at least ⅘ D1 from said upper end as viewed in the laying direction.

14 Claims, 20 Drawing Sheets

Fig. 1 (prior art vessel)

VESSEL WITH ABANDONING AND RECOVERING SYSTEM FOR PIPELINES, METHOD, AND USE OF SAID VESSEL AND SYSTEM

CROSS-REFERENCE TO RELATED APPLICATIONS

This application is the National Stage of International Application No. PCT/NL2008/000138, filed May 28, 2008, the contents of which is incorporated by reference herein.

FIELD OF THE INVENTION

The invention relates to a vessel for laying a pipeline, which vessel comprises a tower. The tower comprises a firing line and is connected to the vessel by a hinge assembly comprising a tower pivot axis. The tower is pivotable relative to the vessel about the tower pivot axis. During pipelaying the tower comprises an upper end and a lower end and the pipeline moves relative to the vessel along the firing line in a laying direction from the upper end towards the lower end. The tower pivot axis is located at a distance D1 from said upper end as viewed in the laying direction. The vessel further comprises an abandonment and recovery system (A&R system) for abandoning and recovering the pipeline. The A&R system comprises an A&R line for lowering and raising an A&R member configured to be connected to the pipeline.

BACKGROUND OF THE INVENTION

The A&R system has the function of moving the pipeline relative to the tower such that the pipeline is lowered from the tower to the seabed (abandoning the pipeline) or raised from the seabed to the tower (recovering the pipeline). Such an abandonment and recovery procedure is often named an A&R procedure.

An A&R operation can occur for various reasons, for instance to place the pipeline in its final position on the seabed after completion, or to lay down a pipeline in order to pick it up and complete it at a later time or with a different vessel. Further, the laying of the pipeline is not possible during bad weather conditions. During bad weather it is not always possible to keep the pipeline suspended from the vessel. Therefore, when bad weather is forecasted, the pipelaying operation has to be stopped and the pipeline has to be abandoned to the seabed. This means that the pipeline is abandoned from the vessel by the A&R system such that said pipeline is positioned on the seabed. The pipeline may remain connected to the vessel via for example a cable. When the weather conditions are improved, the A&R system is used to raise the pipeline from the seabed to resume the pipelaying. Such an A&R procedure is very time consuming. Due to this, much costly operational time in which pipeline can be laid is lost.

In a known vessel, the A&R line is supported by the tower near the upper end thereof. In said known vessel, the A&R line is reeved from an A&R winch located on the vessel deck, through the tower and into the firing line by means of sheaves. One sheave assembly is located near the upper end of the tower and the A&R line is supported by the tower via said sheave assembly. The sheave assembly is located near the upper end of the tower, so that space is provided for the addition of one or more A&R tools to the pipeline. Said A&R tools are used for facilitating the A&R operation and may comprise an A&R head which may be welded on the pipeline and/or associated rigging for connecting or disconnecting the A&R system to or from the pipeline.

During an A&R procedure, the weight of the pipeline is carried by the A&R system. The loads which the A&R systems have to bear are nowadays still increasing since pipelines are laid in increasing water depths (more than 3000 m). The high forces to which the A&R system in use is subjected are in the known vessel transferred to the tower via the sheave assembly. To withstand said forces, a tower with a heavy construction is required. Such a tower is expensive to build and difficult to handle.

SUMMARY OF THE INVENTION

An object of the invention is to provide an A&R system which may be used with a tower with a lighter construction. A further object of the invention is to provide a solution to a problem of the known vessel.

A solution for the problem is found in that the A&R system of the vessel according the invention comprises at least one A&R line for lowering and raising an A&R member configured to be connected to the pipeline, and that the at least one A&R line is supported by the hinge assembly and/or by the tower at a distance of at least $4/5$ D1 from said upper end as viewed in the laying direction.

In the known vessel, the part of the tower extending between the location where the A&R line is supported by the tower (which is the location where the sheave assembly supporting the A&R line is connected to the tower) and the location where the tower is supported by the hinge assembly (which is at the tower pivot axis) is subjected to high pressure forces. Said high pressure forces may exceed the pressure forces to which the tower is subjected during pipelay operations. To withstand said high pressure forces, the tower of the known vessel must have a heavy construction. This means that in the known vessel the part of the tower extending between the upper end and the tower pivot axis comprises a heavy construction to withstand the high pressure forces during an A&R operation.

The part of the tower in the region near the tower pivot axis always has a strong construction, because the tower is supported by the hinge assembly in said region. By supporting the at least one A&R line by the tower at said distance of between $4/5$ D1 and D1 from the upper end, the pressure forces during an A&R procedure are transferred to the part of the tower which is located near the tower pivot axis and has a strong construction. Because of this, the part of the tower extending between the upper end and the location where the at least one A&R line is supported (at said distance of between $4/5$ D1 and D1) is not subjected to said pressure forces and may therefore have a lighter construction than the known vessel. This means that in this situation nearly the whole part of the tower extending between the upper end of the tower and the tower pivot axis may have a lighter construction when compared with the known vessel.

In the situation that the at least one A&R line is supported by the tower at said distance of at least D1 from the upper end, the tower is not subjected to pressure forces but only to tensile forces.

In the situation that the at least one A&R line is (partly) supported by hinge assembly, the force to which the A&R system are subjected are (partly) transferred to said hinge assembly. This means that the forces which the tower has to withstand are reduced. This means that in this situation the tower may have a lighter construction when compared with the known vessel.

In an embodiment of the vessel according the invention, the at least one A&R line is supported by the hinge assembly and/or by the tower at a distance of at least ⅞ D1, preferably ⁹⁄₁₀ D1, from said upper end as viewed in the laying direction. This has the advantage that while use is made of the strong construction of the tower near the tower pivot axis, even a larger part of the tower may have a lighter construction when compared with the known vessel.

In a further embodiment of the vessel according the invention, the at least one A&R line is supported by the hinge assembly and/or by the tower at a distance of at least D1 from said upper end as viewed in the laying direction. This has the advantage that the tower is not subjected to pressure forces. Because of this the tower may have a lighter construction when compared with the known vessel. The at least one A&R line may be supported by the hinge assembly and/or by the tower at a distance of D1 from said upper end as viewed in the laying direction. This provides a simple construction of the hinge assemble and the tower.

The distance between the upper end and the lower end as viewed in the laying direction of the tower is D2 and in the vessel according the invention, the at least one A&R line may be supported by the hinge assembly and/or by the tower at a distance of less than or equal to D2 as viewed in the laying direction. The at least one A&R line may be supported by the hinge assembly and/or by the tower near a distance D2 or at a distance of D2 from said upper end as viewed in the laying direction. This has the advantage that A&R system may also be used for deep water lowering operations, also when the tower is positioned in a substantially horizontal position. During said deep water lowering operation, an item is lowered to the seabed. It will be clear that in this situation the A&R system may also be used for raising an item from the seabed to the vessel.

In a further embodiment of the vessel according the invention, the at least one A&R line is supported by the tower pivot axis. The at least one A&R line may be supported by the hinge assembly and/or by the tower via at least one disc shaped member. The at least one disc shaped member may be connected to the tower pivot axis. The at least one disc shaped member may be rotatable about the tower pivot axis. A tangent line of the circumference of the at least one disc shaped member extends substantially parallel to the firing line. In the situation that one disc shaped member is used, a tangent line of the circumference of said disc shaped member may substantially correspond with the firing line.

In the vessel according the invention, the at least one A&R line may only be supported by the hinge assembly. In another embodiment according the invention, the at least one A&R line may only be supported by the tower.

In a known vessel, the A&R line is supported by the tower near the upper end thereof. In said known vessel, the A&R line is connected to the vessel by a first and second connection. In the first connection, the A&R line is connected to the vessel such that the A&R line is not connected to the hinge assembly and the tower. In the second connection, the A&R line is connected to the vessel such that the A&R line is connected to the tower. In the known vessel, the first connection is located between a winch collecting the A&R line and the tower. The A&R line is reeved from said first connection upward towards the upper end of the tower and subsequently into the firing line by means of a sheave assembly forming the second connection. Said sheave assembly is connected to the tower and the A&R line is supported by the tower via said sheave assembly. The sheave assembly is located near the upper end of the tower, so that space is provided for the addition of one or more A&R tools to the pipeline. Said A&R tools are used for facilitating the A&R operation and may comprise an A&R head which may be welded on the pipeline and/or associated rigging for connecting or disconnecting the A&R system to or from the pipeline.

This means that in the known vessel, the A&R line is routed in the following way. When seen from the first connection, the A&R line is reeved towards the tower and upwards to the second connection formed by a sheave assembly located near the upper end of the tower. Said sheave assembly is connected to the tower and carries the A&R line and its load. Subsequently the A&R line extends towards the lower end of the tower until its connection with the A&R member. Due to this, there is a specific part of the tower over which the A&R line extends twice (first upwards towards the sheave assembly located near the upper end of the tower and then downwards towards the A&R member). This is referred to as the part of the tower over which the A&R line is double reeved.

During an A&R operation, the weight of the pipeline is carried by the A&R line. Due to the fact that the A&R line is double reeved, a specific part of the tower of the known vessel is subjected to up to two times the load to which the A&R line is subjected. This means that during an A&R procedure said part of the tower is subjected to a load which is significantly higher that the load to which the tower is subjected during a pipelaying operation. The known vessel therefore requires a tower with a heavy construction, which is expensive to build and difficult to handle.

This principle applies in a corresponding way to the part of the hinge assembly over which the A&R line extending from the first connection, via the second connection to the A&R member is double reeved.

The invention therefore further relates to a vessel for laying a pipeline, comprising
a tower which comprises a firing line and is connected to the vessel by a hinge assembly comprising a tower pivot axis, wherein:
  the tower is pivotable relative to the vessel about the tower pivot axis,
  during pipelaying the tower comprises an upper end and a lower end and the pipeline moves relative to the vessel along the firing line in a laying direction from the upper end towards the lower end,
an A&R system for abandoning and recovering the pipeline, wherein:
  the A&R system comprises at least one A&R line for lowering and raising an A&R member configured to be connected to the pipeline,
  the at least one A&R line is connected to the vessel by
a first connection wherein the at least one A&R line is not connected to the hinge assembly and/or the tower and
a second connection wherein the at least one A&R line is connected to the hinge assembly and/or the tower, and
  at least one A&R line extending from the first connection, via the second connection to the A&R member is only single reeved.

In the situation that the A&R line extending from the first connection, via the second connection to the A&R member is only single reeved, the A&R line may be reeved such that during an A&R operation the A&R line extending from the first connection, via the second connection to the A&R member does not extend towards the upper end of the tower, as viewed in the laying direction. This has as a result that the hinge assembly and/or the tower is in use subjected to less than two times the load two which the A&R line is subjected. The A&R line extending from the first connection, via the second connection to the A&R member may extend substantially in the laying direction. The forces to which the hinge assembly and/or tower are subjected are hereby even more reduced.

The invention therefore further relates to a vessel for laying a pipeline, comprising
a tower which comprises a firing line and is connected to the vessel by a hinge assembly comprising a tower pivot axis, wherein:
the tower is pivotable relative to the vessel about the tower pivot axis,
during pipelaying the tower comprises an upper end and a lower end and the pipeline moves relative to the vessel along the firing line in a laying direction from the upper end towards the lower end,
an A&R system for abandoning and recovering the pipeline, wherein:
the A&R system comprises at least one A&R line for lowering and raising an A&R member configured to be connected to the pipeline,
the at least one A&R line is connected to the vessel by
a first connection wherein the at least one A&R line is not connected to the hinge assembly and/or the tower and
a second connection wherein the at least one A&R line is connected to the hinge assembly and/or the tower, and
the at least one A&R line extending from the first connection, via the second connection to the A&R member does not extend towards the upper end of the tower, as viewed in the laying direction.

The first connection may comprise a winch for tensioning the at least one A&R line.

In an embodiment of the vessel according the invention, the at least one A&R line is reeved such that during an abandonment operation, the at least one A&R line extending from the first connection, via the second connection to the A&R member does not move towards the upper end of the tower, as viewed in the laying direction.

In a further embodiment of the vessel according the invention, the at least one A&R line is reeved such that during a recovery operation, the at least one A&R line extending from the first connection, via the second connection to the A&R member does not move towards the lower end of the tower, as viewed in the laying direction.

In a further embodiment of the vessel according the invention, the A&R member is configured to be connected to the pipeline at a distance of at least ⅘ D1, preferably at least 9/10 D1, and more preferably at least D1, from the upper end, as viewed in the laying direction.

The invention further relates to a vessel for laying a pipeline, comprising
a tower comprising a firing line, wherein during pipelaying the pipeline moves relative to the vessel along said firing line in a laying direction,
a hang off means for suspending the pipeline from the vessel,
an A&R system for abandoning and recovering the pipeline, wherein said A&R system comprises an A&R member configured to be connected to the pipeline in a position at or past the hang-off means, as viewed in the laying direction.

In an embodiment according the invention, the A&R member is configured to be connected to the pipeline only in a position at the hang off means and the A&R system and hang off means are integrated. In the known vessel, the pipeline is first fixated by the hang off means and after that handed over to the A&R system by connecting the A&R member to the pipeline. The integration of the A&R system and the hang off means provides the advantage that time is saved because the pipeline does not have to be handed over from the hang off means to the A&R system.

In a further embodiment according the invention, the A&R member is configured to be connected to the pipeline only in a position past the hang off means, as viewed in said laying direction. The A&R system may be a separate A&R system and the hang off means may be a separate hang off means. The separate A&R system and separate hang off means indicate that the A&R system and the hang off means are not integrated.

The A&R member of the vessel according the invention, may in use be movable in the laying direction and to a seabed. Said A&R member may be movable in the laying direction over at least 1000 meter, preferably at least 3000 meter, more preferably at least 4000 meter.

In the vessel according to the invention, the A&R system may be configured to abandon and recover the pipeline by the at least one A&R line such that the A&R member is connected to the vessel at two spaced connection points by at least two spaced A&R line parts.

In another embodiment of the vessel according the invention, the A&R system is configured to abandon and recover the pipeline by at least one A&R line such that the A&R member is connected to the vessel via at least two spaced connection points by at least two spaced A&R line parts. The A&R line parts may be seen as the parts of the at least one A&R line extending between the A&R member and the vessel. Due to the two spaced connection points and the spaced A&R line parts rotation of the A&R member during an A&R operation is prevented.

It is noted that the distance between two A&R line parts may be measured substantially perpendicular to the firing line. Said distance may in use be measured in the same direction as a fictive line between the two connection points connecting the A&R member to the vessel.

In the vessel according to the invention, the distance between the outer two of the at least two A&R line parts is substantially between 4 m and 30 m, preferably between 10 m and 22 m, and more preferably between 15 m and 19 m. The distance between the connection points may be between the 4 m and 30 m, preferably between 10 m and 22 m, and more preferably between 15 m and 19 m. Each of said features has a positive effect on preventing rotation of the A&R member during an A&R operation.

It is noted that the distance between connection points connecting the A&R member to the vessel may be measured substantially perpendicular to the firing line. Said distance may in use be measured in the same direction as a fictive line between the two connection points connecting the A&R member to the vessel.

In an embodiment of the vessel according the invention, the A&R member comprises an elongated body which in use extends transverse, preferably substantially perpendicular, to the laying direction. The A&R member may comprise a length of substantially between 4 m and 30 m, preferably between 10 and 22 m, and more preferably between 15 m and 19 m. The specific length of the elongated body has a positive effect on preventing rotation of the A&R member during an A&R operation. The A&R member may comprise a mass of substantially between 50.000 kg and 200.000 kg, preferably between 75.000 kg and 175.000, and more preferably between 100.000 kg and 150.000 kg.

It is noted that the length of the A&R member may be measured along the longitudinal axis of said elongated A&R member.

In a further embodiment according the invention, the vessel comprises positioning means for positioning the A&R member substantially in the firing line. This ensures that when the A&R system is used, the A&R member is positioned in an optimal position for the A&R operation. The positioning means may be configured to move the A&R member between an A&R position in which the A&R member is positioned substantially in the firing line and a non-A&R position in which the A&R member is positioned at a distance from firing line. The distance between the firing line and the non-A&R position may be between around 15 m, preferably around 10 m, and more preferably around 5 m.

The vessel according to the invention may comprise a work station. The vessel also may comprise positioning means which may be configured to move the work station between a work positions in which the work station is positioned substantially in or adjacent to the firing line and a non-work position in which the work station is positioned at a (larger) distance from the firing line. This ensures that an optimal working position is realized for the work station.

This means that the positioning means may be configured to move the A&R member and/or the work station.

In an embodiment according the invention, the vessel comprises a work station and said work station is at least partly integrated with the A&R member.

The vessel according the invention may comprise a connecting member for connecting the A&R member to the pipeline. The connecting member may comprise an endless body, known in the art as a grommet, which is flexible and preferably is buoyant under water. The connecting member may comprise, or consists of, reinforced fibre material. Said reinforced fibre material, may be Ultra high molecular weight polyethylene (UHMWPE), also known as high-modulus polyethylene (HMPE) or high-performance polyethylene (HPPE), (Dyneema, Spectra, TIVAR), Kevlar or other fibre materials. The connecting member may be twistable. The connection member may be twistable over 1800, more preferably over 3600. During lowering of a pipeline towards the sea bed, the pipeline may have a tendency to rotate. It is preferred that such transfer of the rotation of the pipeline to the A&R member is prevented. This is especially preferred in the situation that the A&R member is connected to the vessel by means of at least two spaced A&R line parts, in order to ensure that said A&R line part do not get entangled. The connection member between the pipeline and the A&R member may therefore be able to absorb the majority of the twist generated by the pipeline, thereby limiting the amount of rotation being passed on to the A&R member. The connecting member may be naturally or artificially buoyant. The connecting member may be made of steel with a buoyancy element added or of a less buoyant fibre material with a buoyancy element.

The invention further relates to a vessel for laying a pipeline, comprising
a tower which comprises a firing line and is connected to the vessel by a hinge assembly comprising a tower pivot axis, wherein:
   the tower is pivotable relative to the vessel about the tower pivot axis,
   during pipelaying the tower comprises an upper end and a lower end and the pipeline moves relative to the vessel along the firing line in a laying direction from the upper end towards the lower end, and
an A&R system for abandoning and recovering the pipeline, wherein:
   the A&R system comprises at least one A&R line for lowering and raising an A&R member configured to be connected to the pipeline, and the at least one A&R line is supported by the hinge assembly. The at least one A&R line may be supported by the hinge assembly and the tower. The at least one A&R line may be supported only by the hinge assembly.

The invention also relates to a method for abandoning and/or recovering a pipeline from a pipe laying vessel according the invention.

The invention further relates to a method for abandoning and/or recovering a pipeline from a pipe laying vessel comprising
a tower which comprises a firing line, an upper end, a lower end, and is connected to the vessel by a hinge assembly comprising a tower pivot axis, and
an A&R system for abandoning and recovering the pipeline, wherein the A&R system comprises at least one A&R line for lowering and raising an A&R member configured to be connected to the pipeline,
said method comprising the steps of:
   laying a pipeline such that said pipeline moves relative to the vessel along the firing line and in a laying direction from the upper end towards the lower end,
   supporting the tower by the hinge assembly such that the tower pivot axis is located at a distance D1 as viewed in the laying direction,
   abandoning and/or recovering the pipeline with the A&R system,
   supporting the at least one A&R line by the hinge assembly and/or by the tower at a distance of at least $4/5$ D1 from said upper end as viewed in the laying direction.

An embodiment of the method according the invention, comprises supporting the at least one A&R line by the hinge assembly and/or by the tower at a distance of at least $7/8$ D1, preferably at least $9/10$ D1, from said upper end as viewed in the laying direction. The method may comprise supporting the at least one A&R line by the hinge assembly and/or by the tower at a distance of at least D1 from said upper end as viewed in the laying direction. The method may comprise supporting the at least one A&R line by the hinge assembly and/or by the tower at a distance of D1 from said upper end as viewed in the laying direction.

In a further embodiment of the method according the invention, the distance between the upper end and the lower end as viewed in the laying direction is D2 and the at least one A&R line is supported by the hinge assembly and/or by the tower at a distance of less or equal to D2 as viewed in the laying direction. The at least one A&R line may be supported by the hinge assembly and/or by the tower at a distance of D2 from said upper end as viewed in the laying direction.

The method according the invention may comprise supporting the at least one A&R line by the tower pivot axis. The method may comprise supporting the at least one A&R line by the hinge assembly and/or by the tower via at least one disc shaped member. The at least one disc shaped member may be connected to the tower pivot axis. The at least one disc shaped member may be rotatable about the tower pivot axis. A tangent line of the circumference of the at least one disc shaped member may extend substantially parallel to the firing line.

The method according the invention may comprise supporting the at least one A&R line only by the hinge assembly. The method according the invention may comprise supporting the at least one A&R line only by the tower.

The invention further relates to a method for abandoning and/or recovering a pipeline from a pipe laying vessel comprising
a tower which comprises a firing line, an upper end, a lower end, and is connected to the vessel by a hinge assembly comprising a tower pivot axis, and an A&R system for abandoning and recovering the pipeline, wherein the A&R system comprises at least one A&R line for lowering and raising an A&R member configured to be connected to the pipeline, said method comprising the steps of:
laying a pipeline such that said pipeline moves relative to the vessel along the firing line and in a laying direction from the upper end towards the lower end,
abandoning and/or recovering the pipeline with the A&R system, wherein the at least one A&R line is connected to the vessel by a first connection wherein the at least one A&R line is not connected to the hinge assembly and/or the tower and a second connection wherein the at least one A&R line is connected to the hinge assembly and/or the tower, and the at least one A&R line extending from the first connection, via the second connection to the A&R member is only single reeved.

The invention further relates to a method for abandoning and/or recovering a pipeline from a pipe laying vessel comprising a tower which comprises a firing line, an upper end, a lower end, and is connected to the vessel by a hinge assembly comprising a tower pivot axis, and an A&R system for abandoning and recovering the pipeline, wherein the A&R system comprises at least one A&R line for lowering and raising an A&R member configured to be connected to the pipeline, said method comprising the steps of:
laying a pipeline such that said pipeline moves relative to the vessel along the firing line and in a laying direction from the upper end towards the lower end,
abandoning and/or recovering the pipeline with the A&R system, wherein the at least one A&R line is connected to the vessel by a first connection wherein the at least one A&R line is not connected to the hinge assembly and/or the tower and a second connection wherein the at least one A&R line is connected to the hinge assembly and/or the tower, and the at least one A&R line extending from the first connection, via the second connection to the A&R member does not extend towards the upper end of the tower, as viewed in the laying direction.

The first connection may comprise a winch for tensioning the at least one A&R line.

In the method according the invention, the at least one A&R line is reeved such that during an abandonment operation, the at least one A&R line extending from the first connection, via the second connection to the A&R member does not move towards the upper end of the tower, as viewed in the laying direction.

In the method according the invention, the at least one A&R line is reeved such that during a recovery operation, the at least one A&R line extending from the first connection, via the second connection to the A&R member does not move towards the lower end of the tower, as viewed in the laying direction.

The method according the invention may comprise connecting the A&R member to the pipeline at a distance of at least ⅘ D1, preferably at least 9/10 D1, and more preferably at least D1, from the upper end, as viewed in the laying direction.

The invention further relates to a method for abandoning and/or recovering a pipeline from a pipe laying vessel comprising a tower comprising a firing line, said method comprising the steps of:
laying a pipeline such that said pipeline moves relative to the vessel along the firing line and in a laying direction,
suspending the pipeline from the vessel with a hang off means, and
connecting an A&R member of an A&R system to the pipeline in a position at or past the hang off means, as viewed in said laying direction.

The method according the invention may comprise connecting the A&R member to the pipeline only in a position at the hang off means and the A&R system and hang off means are integrated. The method according the invention may comprise, connecting the A&R member to the pipeline only in a position past the hang off means, as viewed in said laying direction.

The method according the invention may further comprise moving the A&R member in the laying direction and to a seabed. Said method may comprise moving the A&R member in the laying direction over at least 1000 meter, preferably at least 3000 meter.

The method according the invention may comprise performing an abandonment and/or recovery operation of the pipeline by the at least one A&R line such that the A&R member is connected to the vessel via at least two spaced connection points by at least two spaced A&R line parts. The distance between the outer two of the at least two A&R line parts may be substantially between 4 m and 30 m, preferably between 10 m and 22 m, and more preferably between 15 m and 19 m. The distance between the connection points is between the 4 m and 30 m, preferably between 10 m and 22 m, and more preferably between 15 m and 19 m.

In the method according the invention, the A&R member may comprise an elongated body which in use extends transverse, preferably substantially perpendicular, to the laying direction. The A&R member may comprise a length of substantially between 4 m and 30 m, preferably between 10 and 22 m, and more preferably between 15 m and 19 m. The A&R member may comprise a mass of substantially between 50.000 kg and 200.000 kg, preferably between 100.000 kg and 150.000 kg.

The method according the invention may comprise positioning the A&R member substantially in the firing line. The method according the invention may comprise moving the A&R member between an A&R position in which the A&R member is positioned substantially in the firing line and a non-A&R position in which the A&R member is positioned at a distance from the firing line.

The method according the invention may comprise moving a work station between a work position in which the work station is positioned substantially in or adjacent to the firing line and a non-work position in which the work station is positioned at a (larger) distance from the firing line.

In the method according the invention, the vessel may comprise a work station and said work station may at least be partly integrated with the A&R member.

The method according the invention may comprise connecting the A&R member to the pipeline by a connecting member comprising an endless body which is flexible and buoyant.

The connecting member may be naturally or artificially buoyant. The connecting member may comprise reinforced fibre material as mentioned above. The connecting member may be twistable as mentioned above.

The invention further relates to a method for abandoning and/or recovering a pipeline from a pipe laying vessel comprising a tower which comprises a firing line, an upper end, a lower end, and is connected to the vessel by a hinge assembly comprising a tower pivot axis, and an A&R system for abandoning and recovering the pipeline, wherein the A&R system comprises at least one A&R line for lowering and raising an A&R member configured to be connected to the pipeline, said method comprising the steps of:

laying a pipeline such that said pipeline moves relative to the vessel along the firing line and in a laying direction from the upper end towards the lower end, abandoning and/or recovering the pipeline with the A&R system, supporting the at least one A&R line by the hinge assembly. The method may comprise supporting the at least one A&R line by the hinge assembly and the tower. The method may comprise supporting the at least one A&R line only by the hinge assembly.

The invention further relates to the use of the vessel according to invention.

The invention further relates to an A&R system for use in a vessel according to the invention.

The invention further relates to the use of the A&R system according to the invention.

It will be clear that one feature or more features which is or are only explicitly mentioned in relation to one or more of the vessel, method, A&R system, use of vessel, use of A&R system according to the invention, also implicitly relates to the other or others of the vessel, method, A&R system, use of vessel, use of A&R system according to the invention.

BRIEF DESCRIPTION OF THE DRAWINGS

The invention will below be discussed in detail with reference to the accompanying figures, in which.

DETAILED DESCRIPTION OF THE INVENTION

It is noted that in the FIGS. 1-20 corresponding reference numbers relate to corresponding features.

Figure 1:
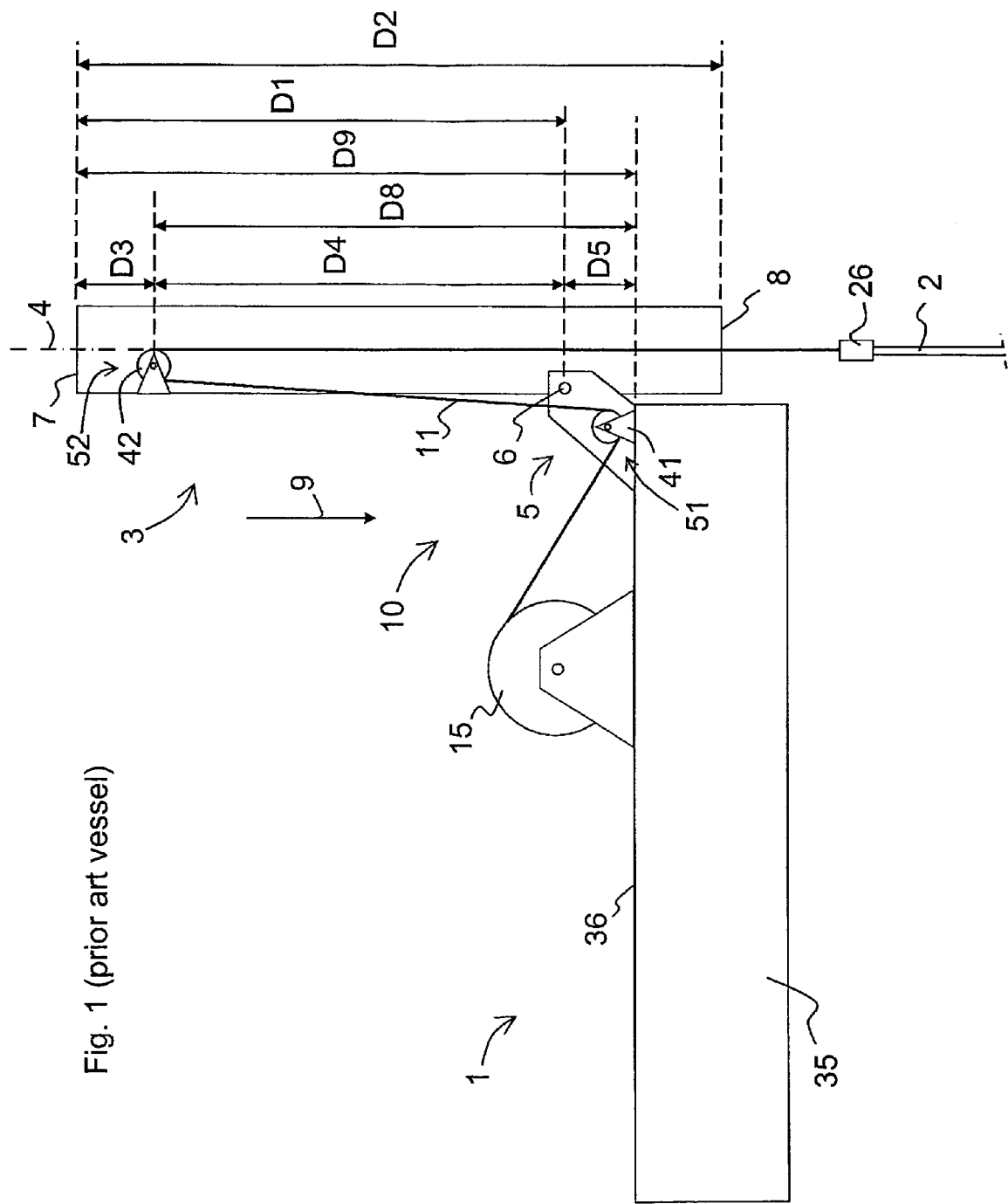
FIG. 1 shows schematically a side view of a vessel known from the prior art.

FIG. 1 schematically shows a side view of a vessel known from the prior art. The vessel 1 is configured for laying a pipeline 2. The vessel 1 comprises a hull 35. A tower 3 comprising a firing line 4 is connected to the vessel 1 by a hinge assembly 5. The tower 3 is pivotable relative to the hull 35 of the vessel 1 about a tower pivot axis 6. During pipelaying the tower 3 comprises an upper end 7 and a lower end 8. When the pipeline 2 is laid, the pipeline 2 moves relative to the hull 35 of the vessel 1 along the firing line 4 in a laying direction 9 from the upper end 7 towards the lower end 8. The tower pivot axis 6 is located at a distance D1 from said upper end 7 as viewed in the laying direction 9. The lower end 8 is located at a distance D2 from said upper end 7 as viewed in the laying direction 9.

The vessel 1 further comprises an A&R system 10 for abandoning and recovering the pipeline 2. Said A&R system 10 comprises at least one A&R line 11 for lowering and raising an A&R member 26. The A&R member 26 is configured to be connected to the pipeline 2. The A&R system 10 further comprises an A&R winch 15 located on the deck 36 of the vessel 1. The A&R line 11 extends from the A&R winch 15 towards the tower 3. The A&R line 11 is subsequently redirected towards the upper end 7 of the tower 3 via a first sheave assembly 41. The first sheave assembly 41 is connected to the deck 36 of the vessel 1 at a distance D9 from the upper end 7 of the tower 3 as viewed in the laying direction 9. A second sheave assembly 42 is located near the upper end 7 of the tower 3. The second sheave assembly 42 is located at a distance of D3 from the upper end 7 of the tower 3 as viewed in the laying direction 9. The second sheave assembly 42 redirects the A&R line 11 towards the lower end 8 of the tower 3 such that the A&R line 11 is positioned in the firing line 4. The A&R line 11 extends from the second sheave 42 to the A&R member 26.

The first sheave assembly 41 forms the first connection 51 wherein the A&R line 11 is not connected to the hinge assembly 5 and the tower 3. The second sheave assembly 42 forms the second connection 52 wherein the A&R line 11 is connected to the tower 3. This means that part of the A&R line 11 extending from the first sheave assembly 41 (first connection 51) via the second sheave assembly 42 (second connection 52) to the A&R member 26 is double reeved. The A&R line 11 is double reeved over a distance D8 as viewed in the laying direction 9. This means that during an abandonment or recovery operation, the part of the tower 3 extending over D4 and the part of the hinge assembly extending over D5, as viewed in the laying direction, are subjected to up to two times the load to which the A&R line 11 is subjected during an abandonment or recovery operation. If the first sheave assembly 41 is positioned at a distance D1 from the upper end 7, as viewed in the laying direction, only the tower 3 and not the hinge assembly 5 will be subjected to up to two times the load to which the A&R line 11 is subjected.

Due to the fact that the A&R line 11 is supported by the second sheave assembly 42 located near the upper end 7 of the tower 3, the part of the tower 3 indicated by D4 is subjected to high pressure forces. D4 extends between the location where the A&R line 11 is carried by the tower 3 (which is the location where the second sheave assembly 42 is connected to the tower 3) and the location where the tower 3 is supported by the hinge assembly 5 (which is at the tower pivot axis 6).

Figure 2:
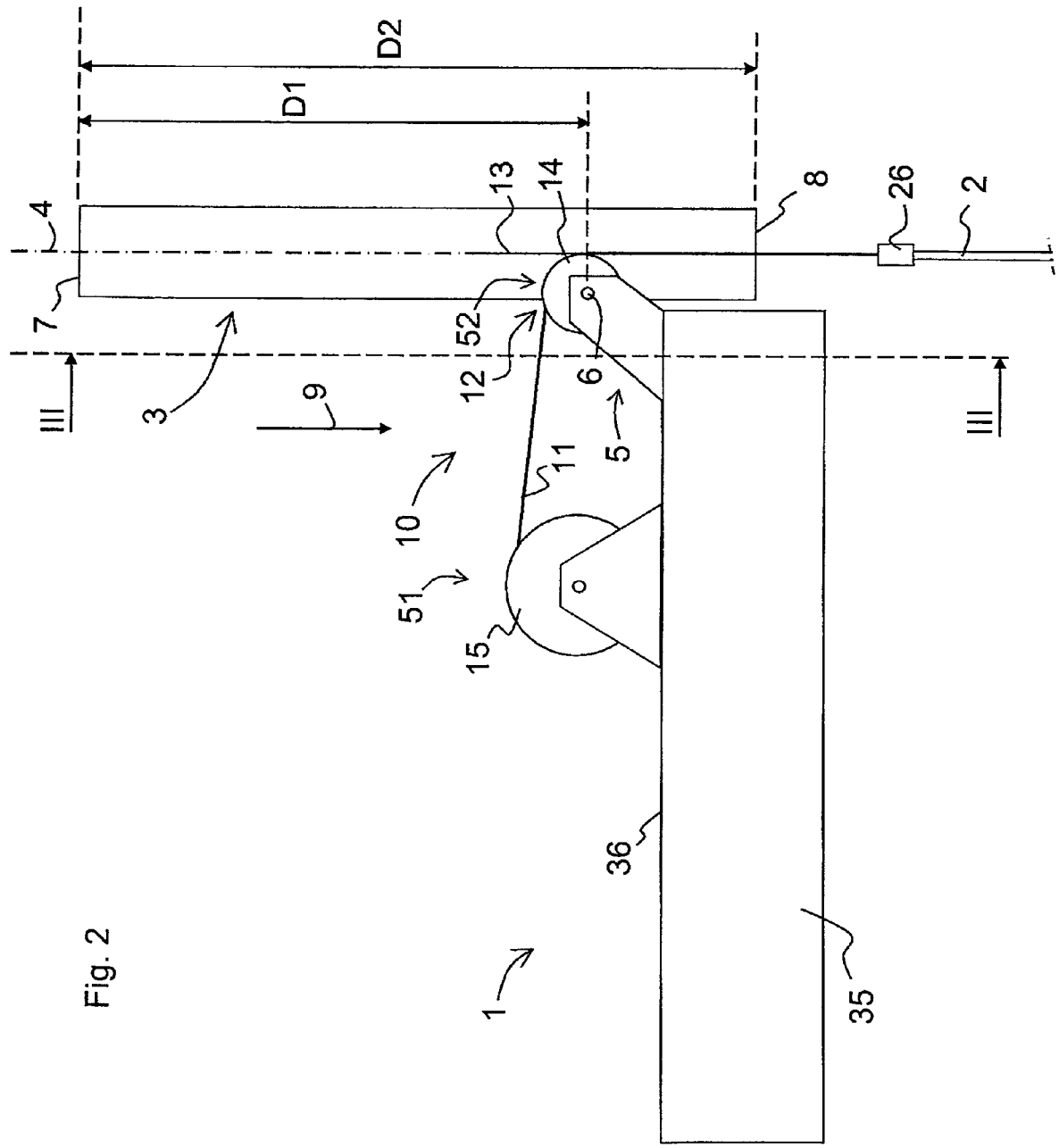
FIG. 2 shows schematically a side view of a vessel according the invention.

FIG. 2 schematically shows a side view of a vessel according the invention. The A&R line 11 is supported by the hinge assembly 5 at a distance of D1 from the upper end 7 of the tower 3 as viewed in the laying direction 9. The A&R line 11 is supported by the tower pivot axis 6 via a disc shaped member 12. The indicated tangent line 13 of the circumference 14 of the disc shaped member 12 extends parallel to the firing line 4.

The winch 15 forms the first connection 51 wherein the A&R line 11 is not connected to the hinge assembly 5 and the tower 3. The disc shaped member 12 forms the second connection 52 wherein the A&R line 11 is connected to the hinge assembly 5. This means that the part of the A&R line 11 extending from the winch 15 (first connection 51) via the disc shaped member 12 (second connection 52) to the A&R member 26 is only single reeved. This means that said part of the A&R line 11 is not double reeved. Said part of the A&R line 11 does not extend towards the upper end 7 of the tower 3, as viewed in the laying direction 9. As a result of this, during an abandonment procedure said part of the A&R line 11 does not move towards the upper end 7 of the tower 3, as viewed in the laying direction 9. During a recovery procedure said part of the A&R line 11 does not move towards the lower end 8 of the tower 3, as viewed in the laying direction 9.

Figure 3:
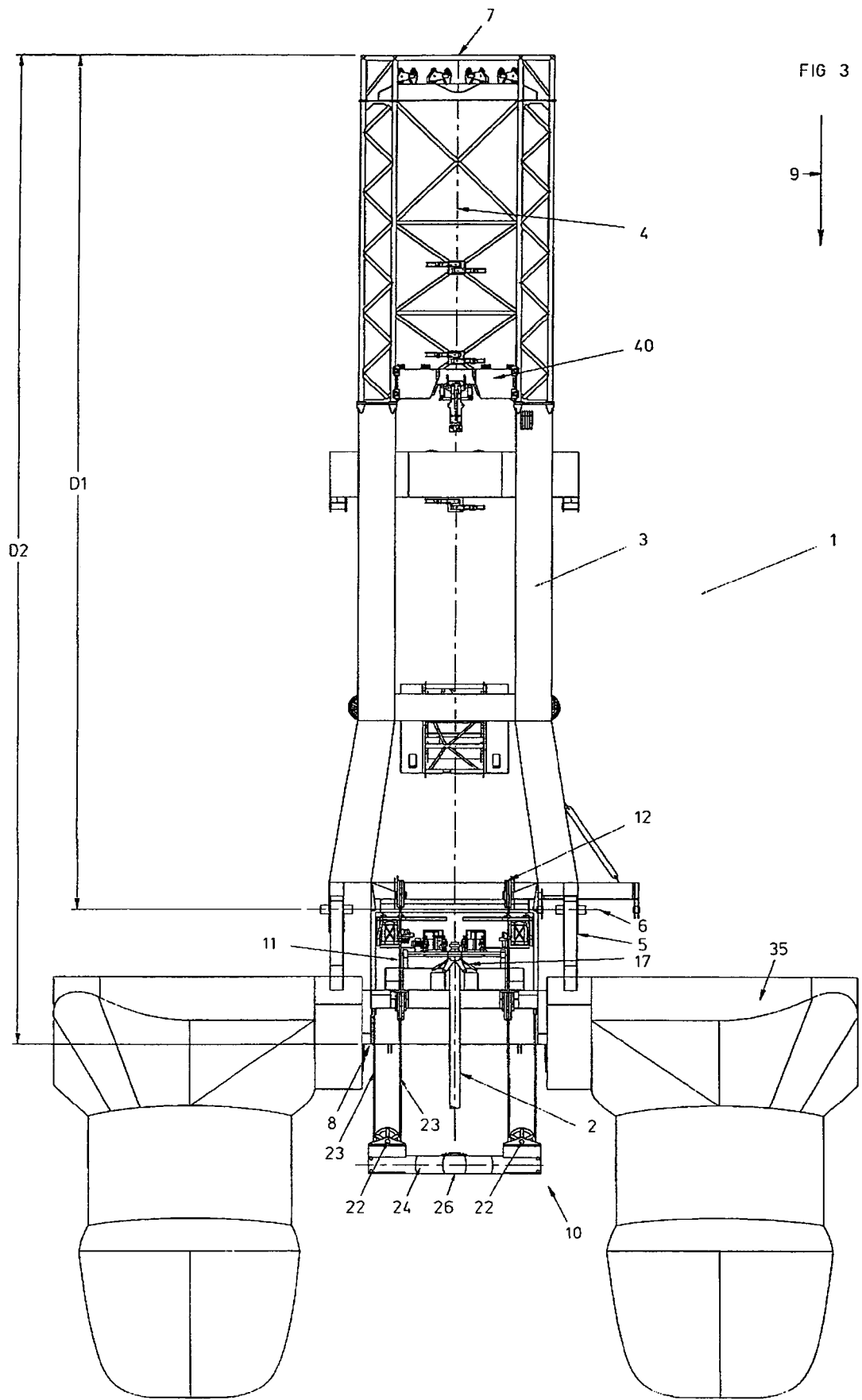
FIG. 3 shows schematically a view in cross section of the vessel of FIG. 2.

FIG. 3 schematically shows a view in cross section in the direction of III-III of FIG. 2. The A&R system 10 comprises two A&R lines 11. Each A&R line 11 is connected to the A&R member 26 at a connection point 22. This means that the A&R member 26 is connected to the vessel at two spaced connection points 22. Each connection point 22 is connected to the vessel via two A&R line parts 23. The A&R member 26 comprises an elongated body 24. The tower 3 further comprises hang off means 17 for suspending the pipeline 2.

The FIGS. 4-15 schematically show an abandonment procedure with the vessel of FIG. 3. For clarity reasons only the tower 3 of the vessel is shown. Furthermore, the A&R member and the A&R lines are not shown in the FIGS. 4-7.

Figure 4:
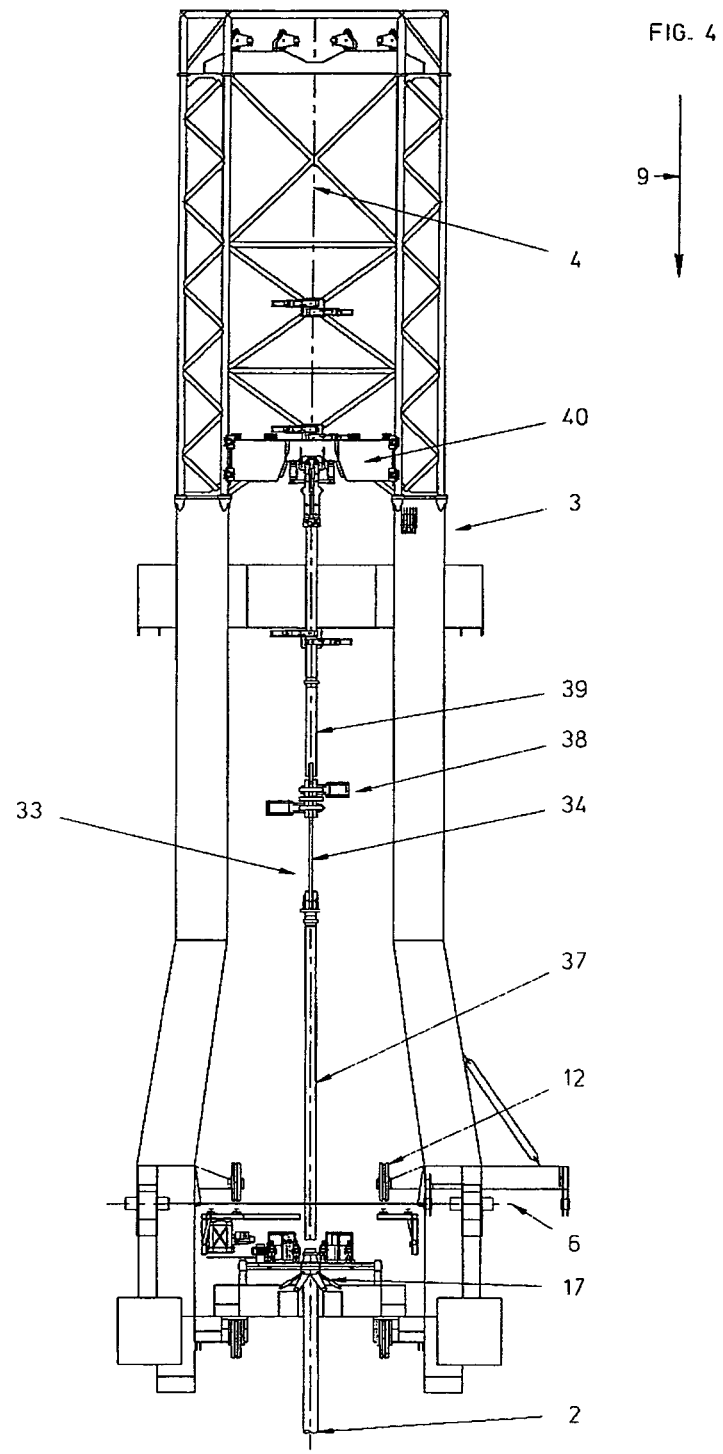
FIG. 4-16 shows schematically an abandonment procedure according the invention.

In FIG. 4 the pipeline 2 is fixated by the hang off means 17. An A&R head 37 is positioned above and in line with the pipeline 2. Said A&R head 37 is connected via a connecting member 33 and a coupling member 38 to a lowering member 39. The lowering member 39 is fixated in a lowering block 40. The lowering block 40 is movable in the tower 3 in and opposite to the laying direction 9. The connecting member 33 comprises an endless body 34.

Figure 5:
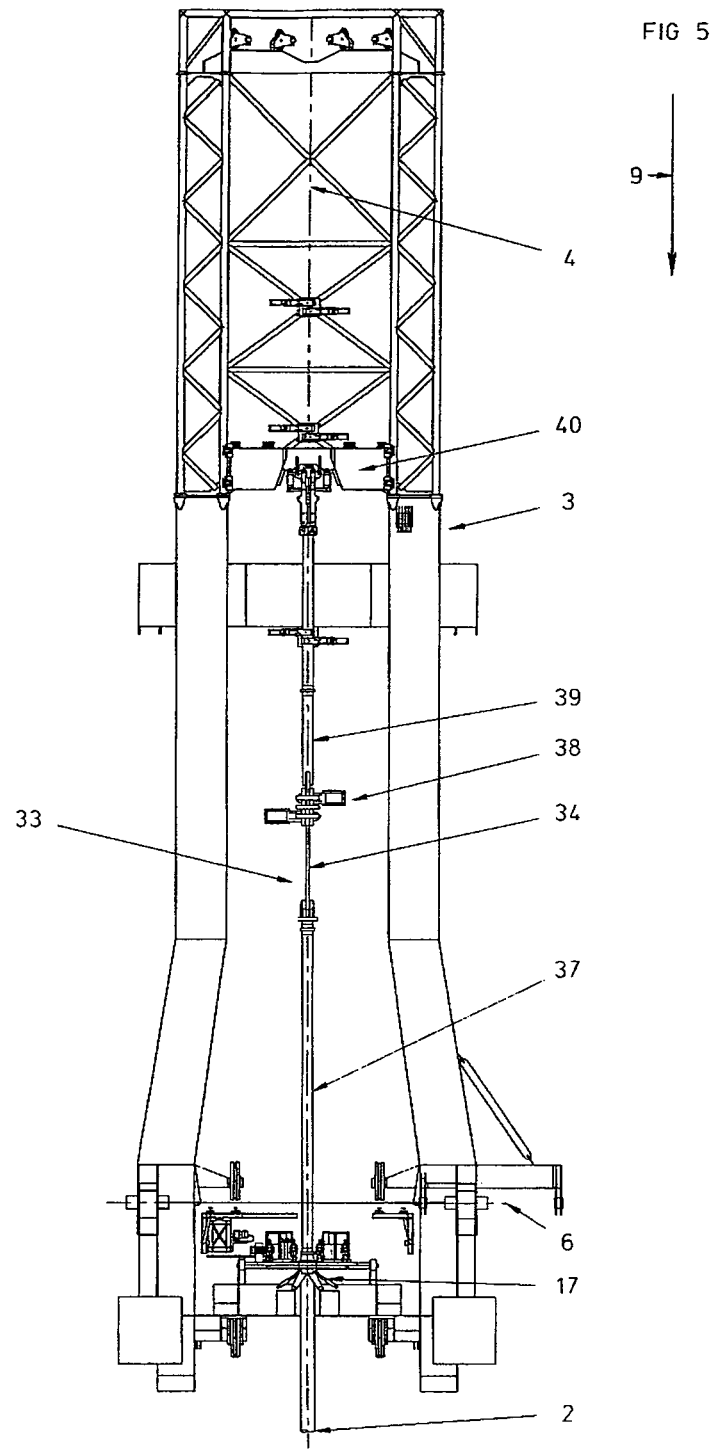

In FIG. 5, the lowering block 40 is lowered such that the A&R head 37 is positioned on the pipeline 2. After that, the A&R head 37 is connected to the pipeline 2.

Figure 6:
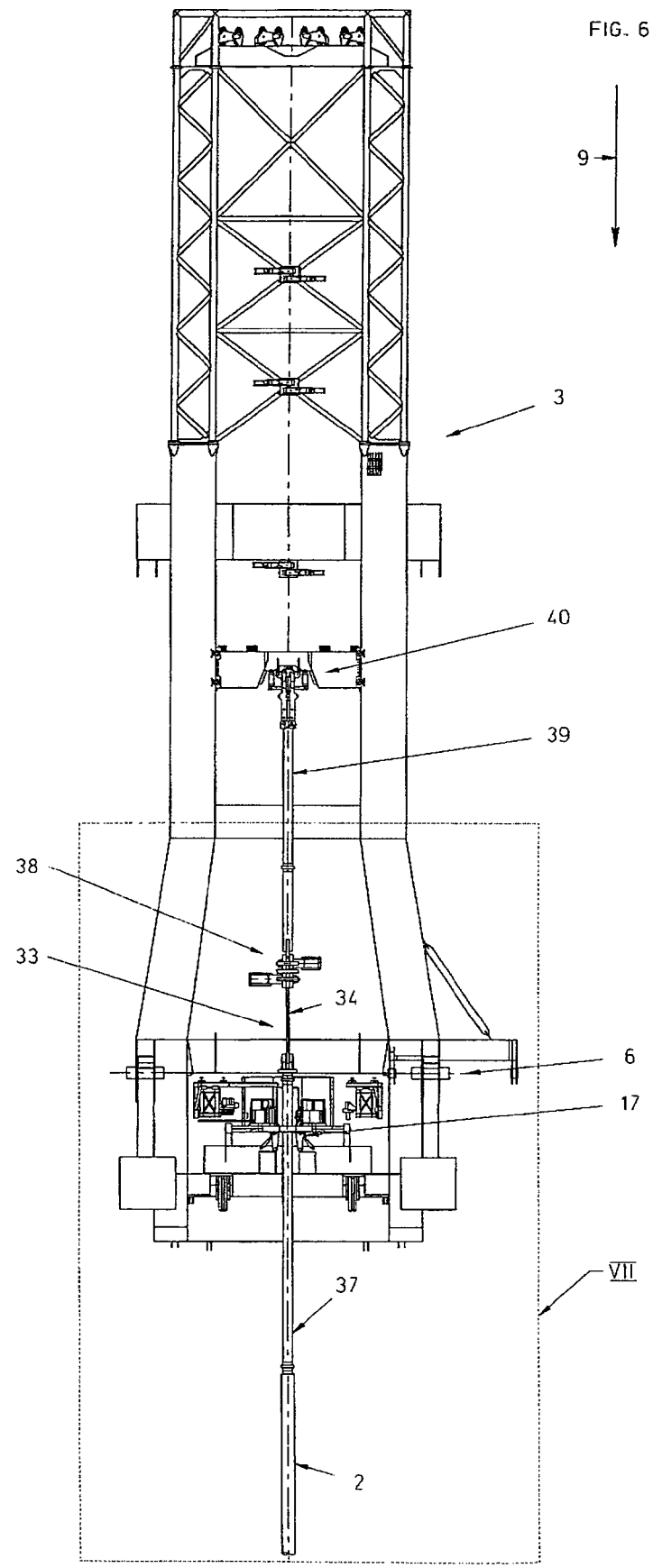

As shown in FIG. 6, the hang off means 17 are subsequently disengaged from the pipeline 2 and the pipeline 2 is lowered in the laying direction 9 by lowering the lowering block 40.

Figure 7:
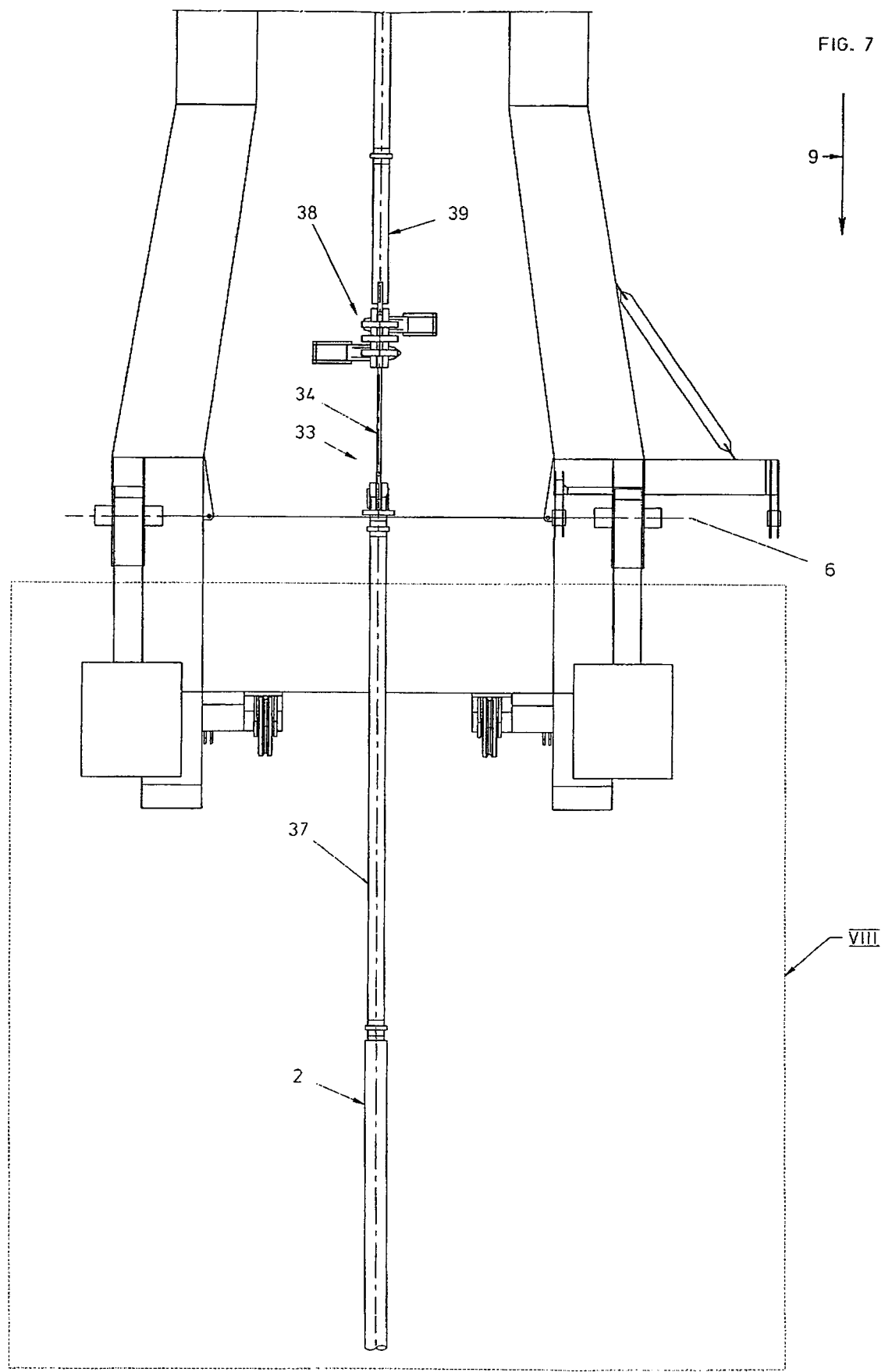

FIG. 7 shows the part VII of FIG. 6 in an enlarged view. For clarity reasons the hang off means 17 and the surrounding equipment are not shown.

Figure 8:
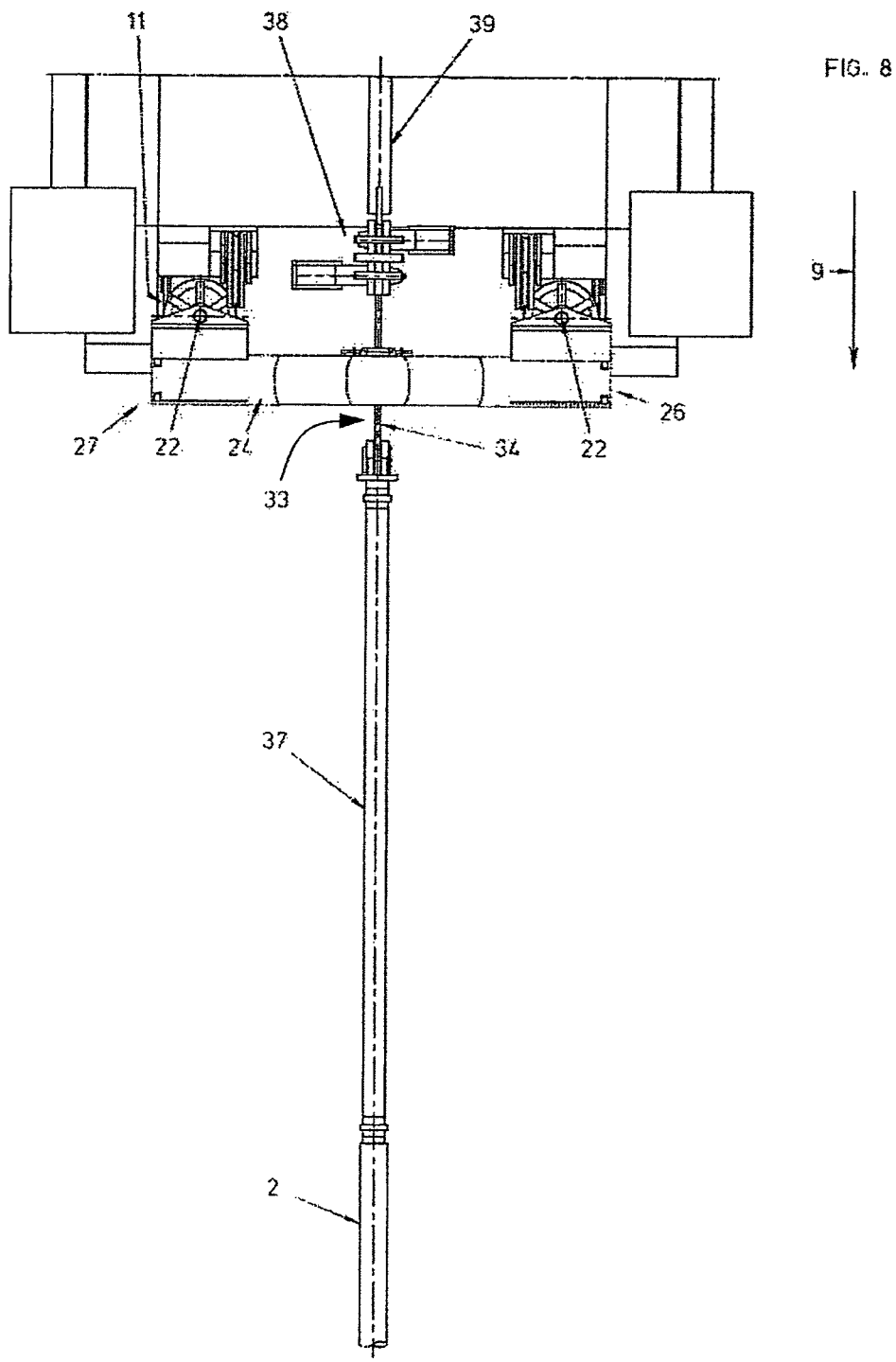

FIG. 8 shows the part VIII of FIG. 7. In FIG. 8, the pipeline 2 is further lowered and the A&R member 26 is positioned in the A&R position 27 thereof. In FIG. 8, the A&R member 26 faces the connecting member 33.

Figure 9:
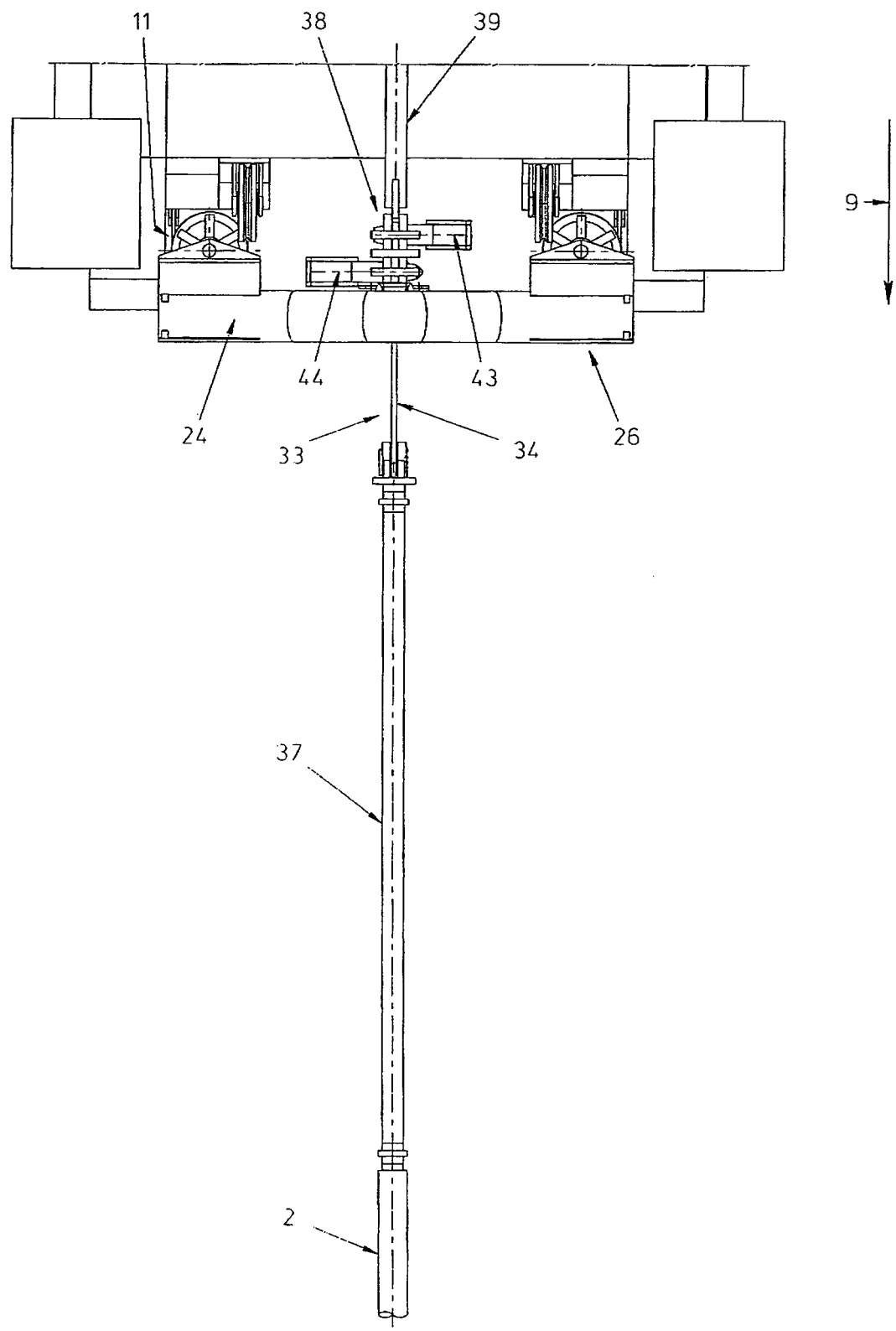

In FIG. 9, the pipeline 2 is further lowered such that the coupling member 38 makes contact with the A&R member 26. The coupling member 38 comprises a first lock 43 and a second lock 44. In FIG. 9, the second lock 44 makes contact with the A&R member 26. Said second lock 44 is subsequently locked.

Figure 10:
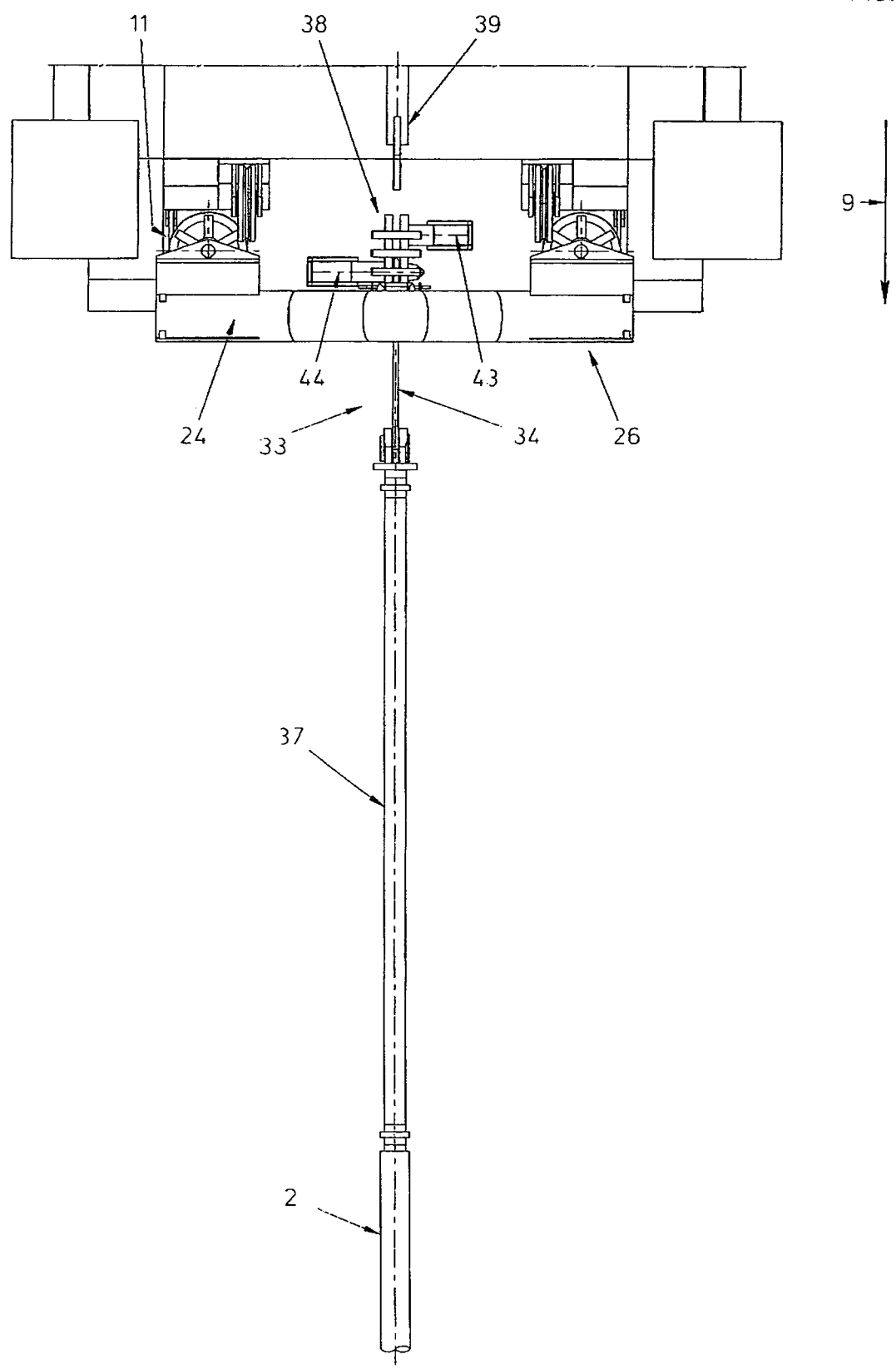

As shown in FIG. 10, the first lock 43 is opened and the pipeline 2 is handed over to the A&R member 26. This means that in FIG. 10, the pipeline 2 suspends from the A&R member 26. The lowering member 39 is subsequently raised in a direction opposite to the laying direction 9.

Figure 11:
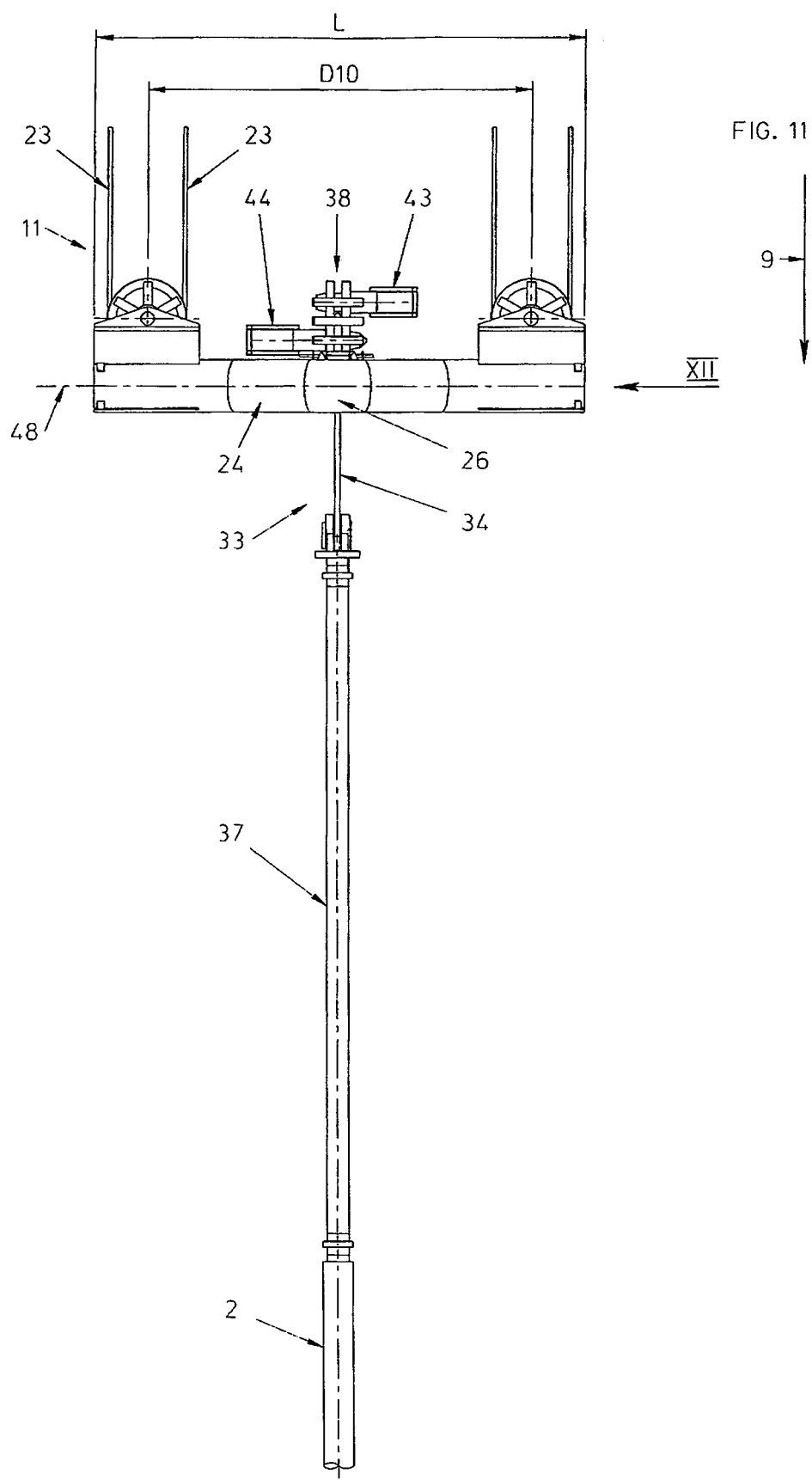
Figure 12:
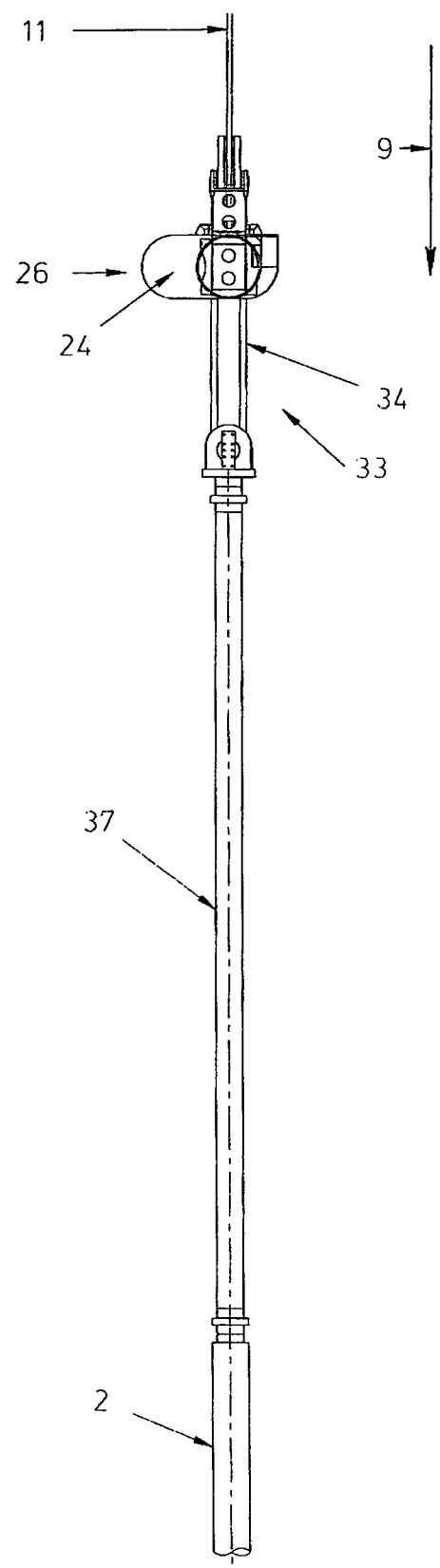
Figure 13:
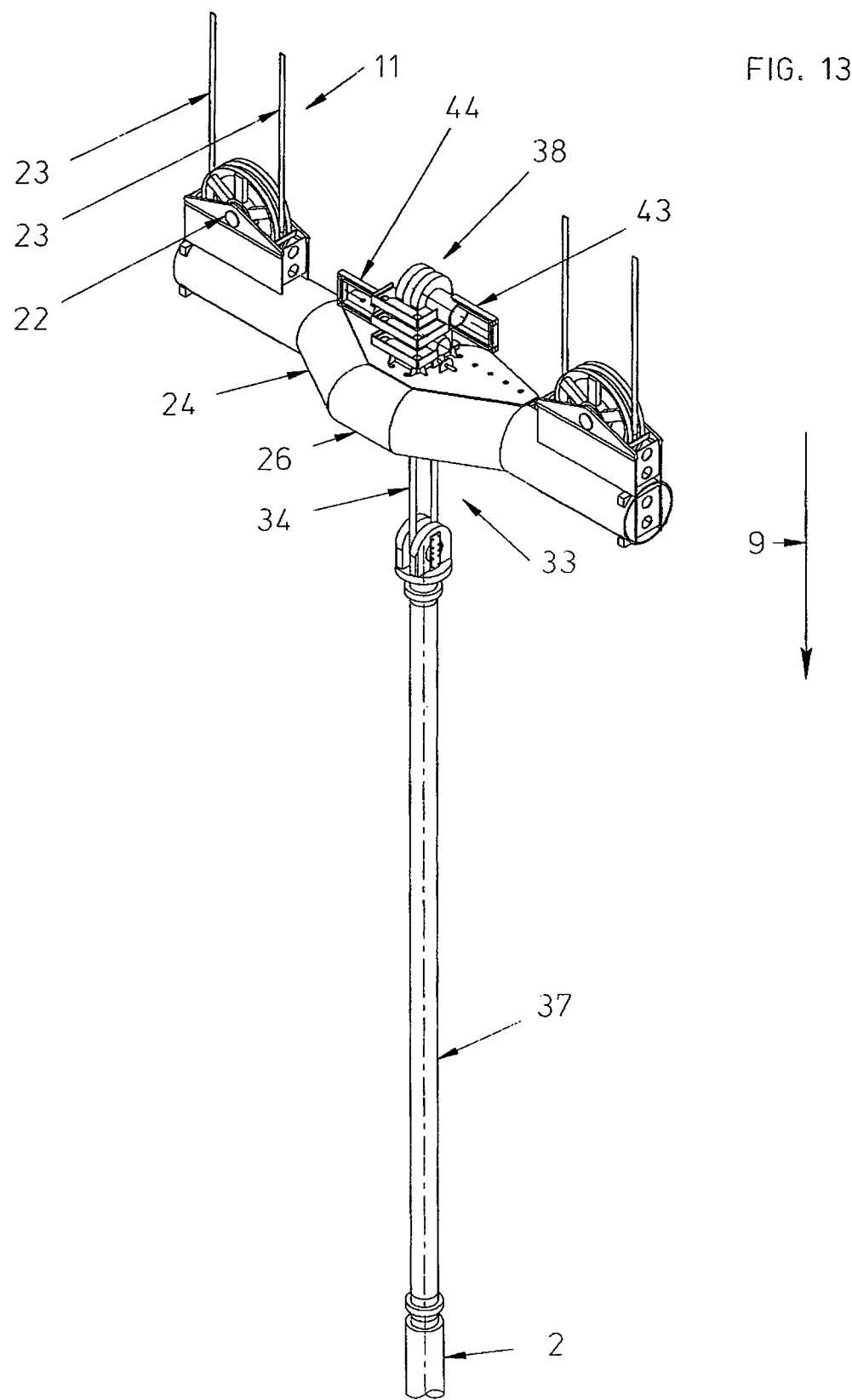

In FIG. 11 the A&R member 26 is further lowered in the laying direction 9 and towards the seabed. The distance D10 between the connection points 22 is indicated in FIG. 11. The length L and the longitudinal axis 48 of the A&R member 26 member are also indicated in FIG. 11. FIG. 12 shows a side view of the A&R member 26 as indicated by arrow XII in FIG. 11. FIG. 13 shows a perspective view of the A&R member 26 of FIGS. 11 and 12.

Figure 14:
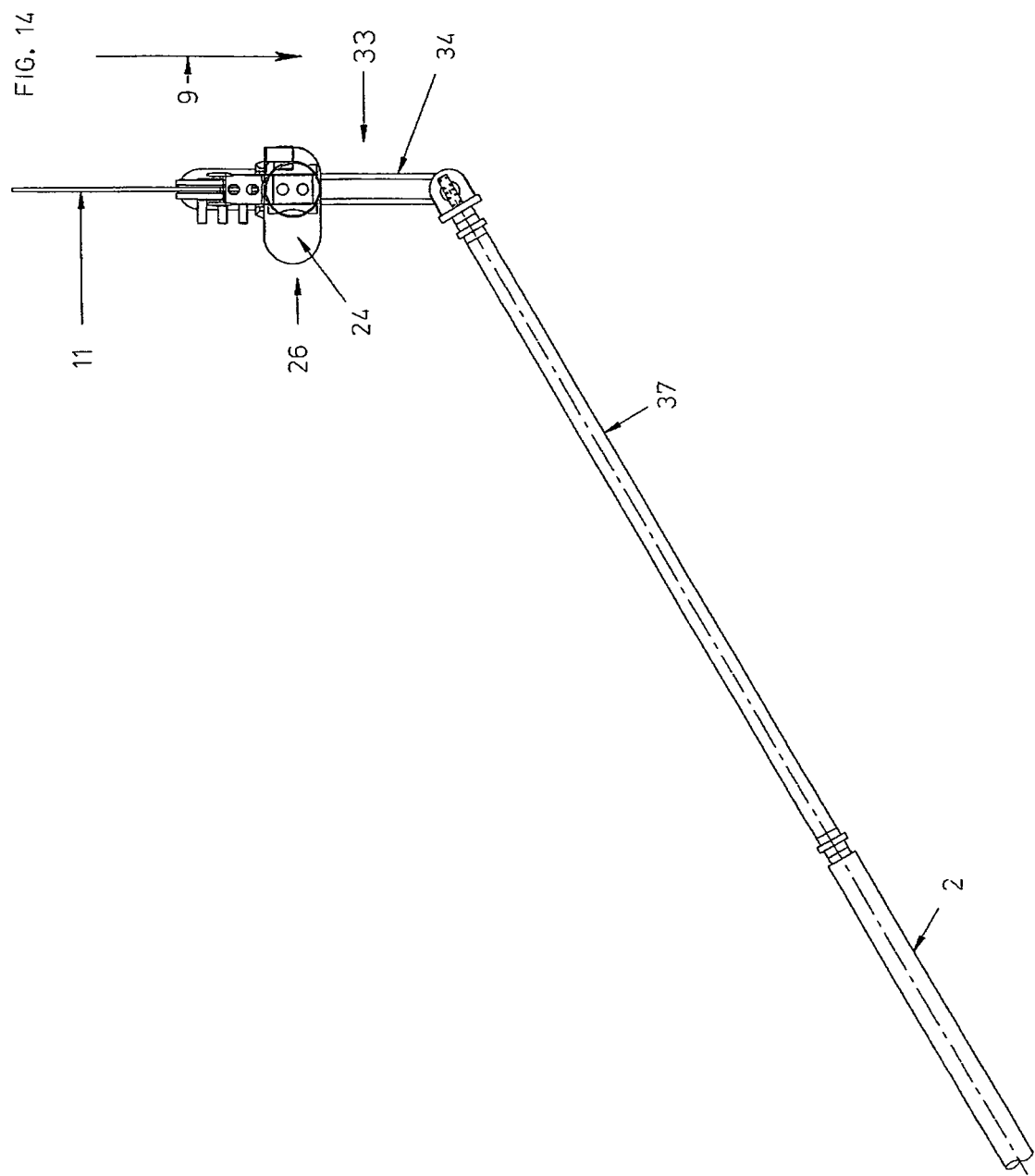
Figure 15:
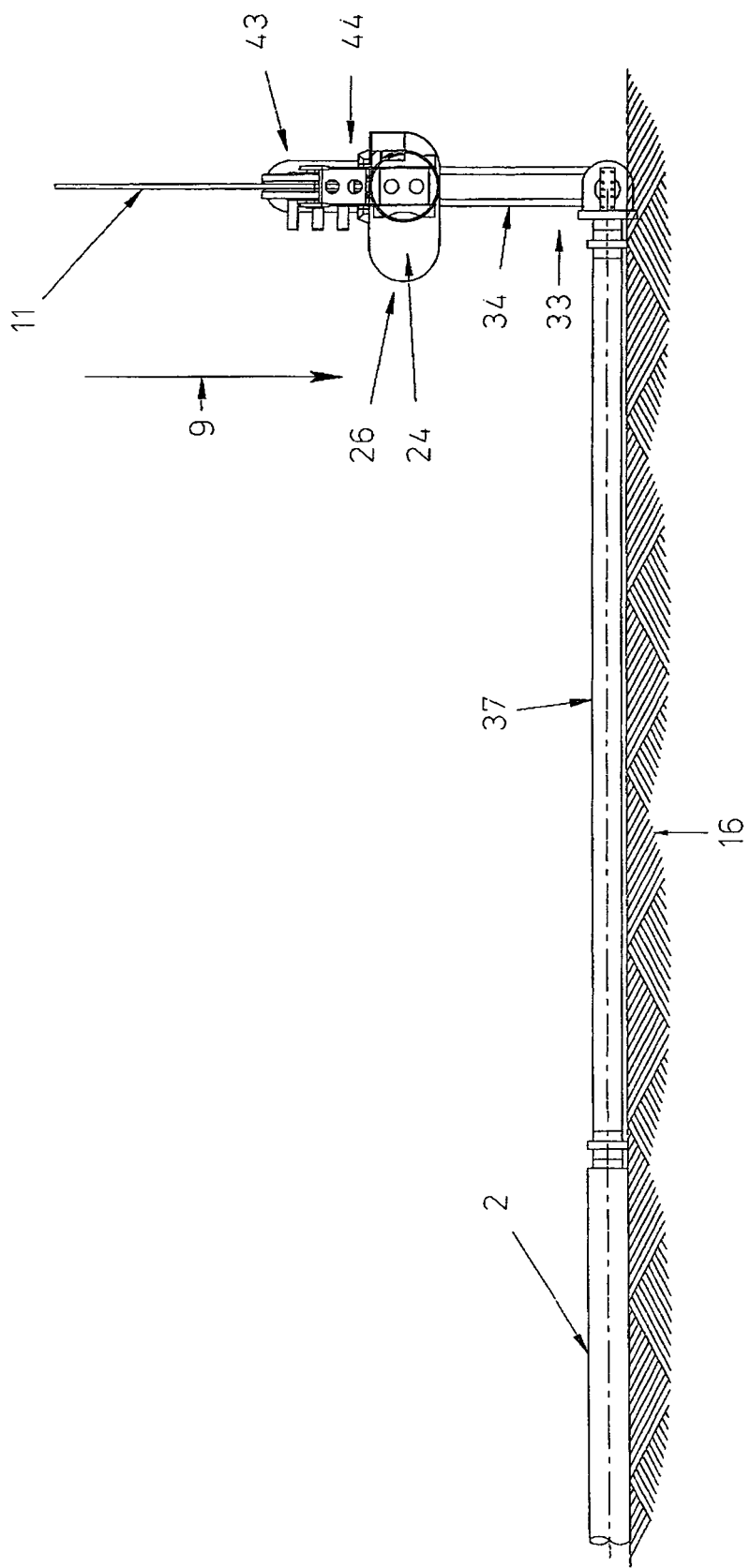
Figure 16:
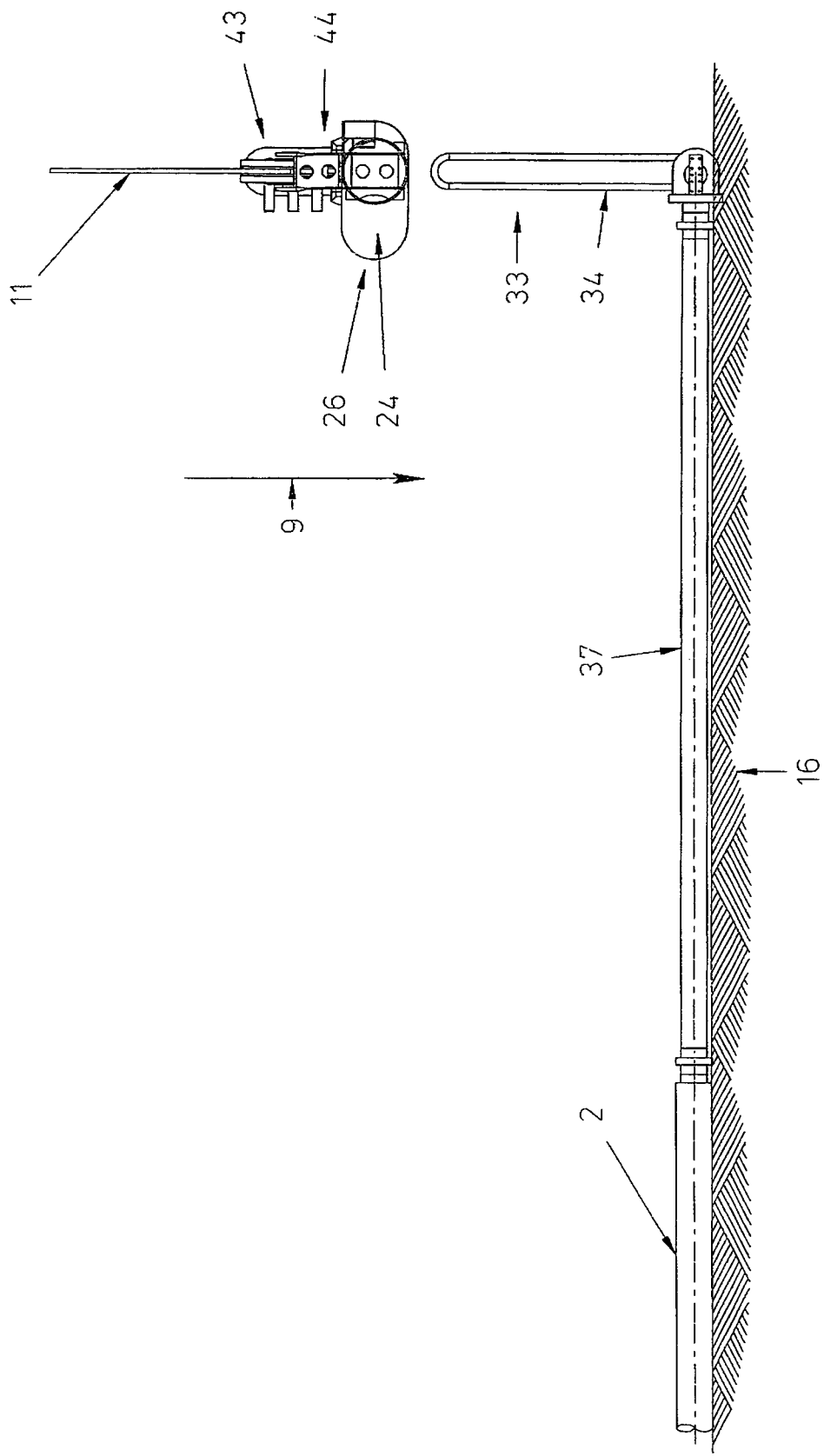

FIG. 14 shows the side view of FIG. 12, wherein the pipeline is further lowered and approaching the seabed. In FIG. 15, the pipeline 2 is positioned on the seabed 16. In this position the second lock 44 is opened for disconnecting the A&R member 26 from the pipeline 2. More specifically, the A&R member 26 is disconnected from the connecting member 33 and subsequently raised in a direction opposite to the laying direction 9. This is shown in FIG. 16. The buoyant endless body 34 positions itself in an upright position extending from the seabed 16. This facilitates the connection of the A&R member 26 to the connecting member 33 during a recovery operation.

Figure 17:
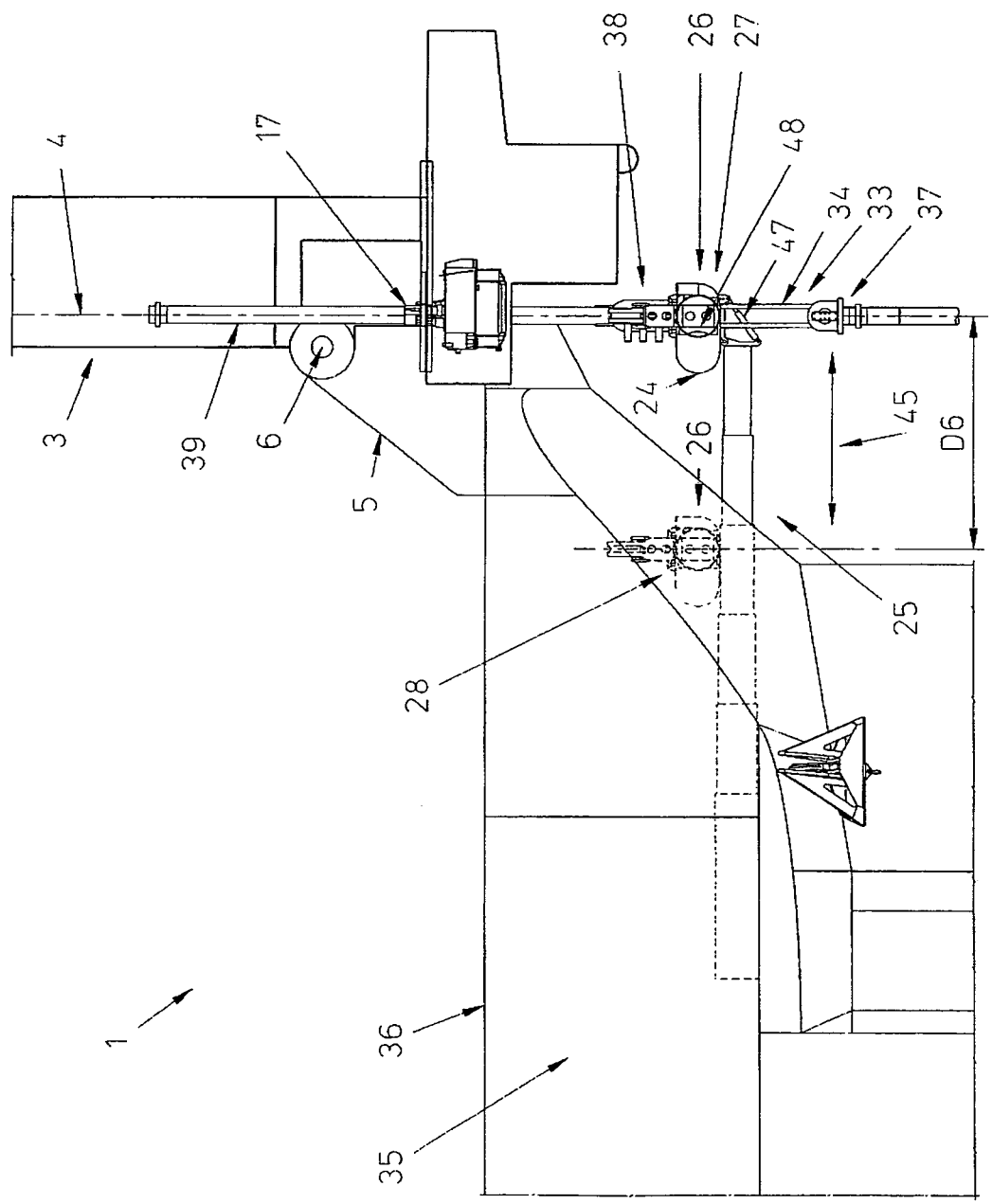
FIGS. 17 and 18 shows schematically a vessel according the invention provided with positioning means.

FIG. 17 shows schematically a vessel 1 according the invention provided with positioning means 25. The positioning means 25 are configured such that the A&R member 26 is displaceable between an A&R position 27 and a non-A&R position 28. This is achieved by moving the A&R member 26 in the direction of arrow 45 by means of the positioning means 25. The distance D6 between the firing line 4 and the non-A&R position is indicated.

Figure 18:
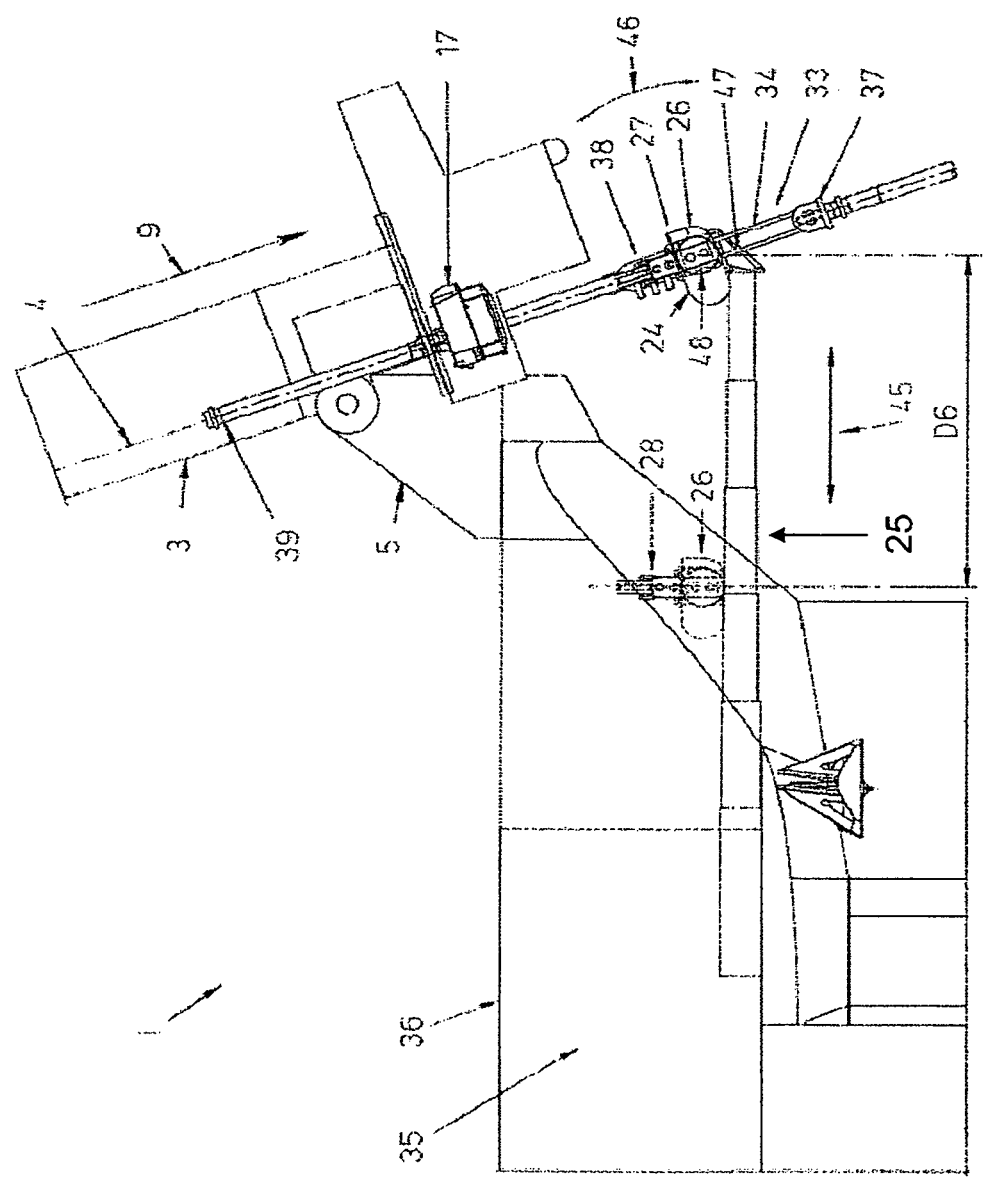

FIG. 18 shows the functioning of the positioning means 25 in the situation that the tower 3 is positioned in a different position. Besides moving the A&R member 26 in the direction 45, the positioning means 25 is configured to rotate the A&R member 26 to adjust to the position of the tower 3. Said rotation of the A&R member 26 is indicated by arrow 46. Said rotation is created by rotation means 47 provided on the positioning means 25. Said rotation is preferably subsequently about the longitudinal axis 48 of the A&R member 26.

Figure 19:
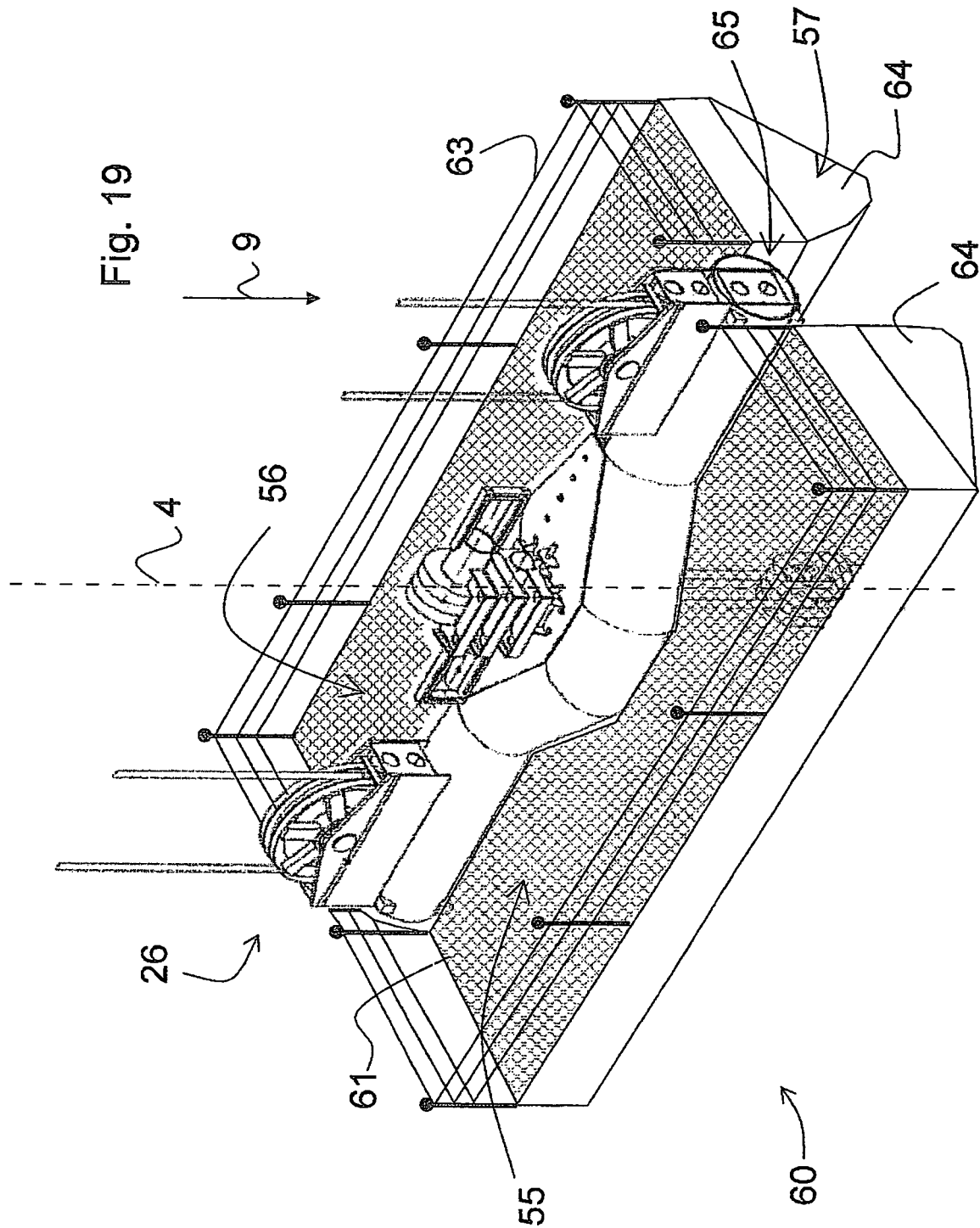
FIG. 19 shows schematically a perspective view of the A&R member and a work station according to the invention.

FIG. 19 shows the A&R member 26 positioned in a work station 60. The work station 60 is provided on the vessel. Said work station 60 may comprises a first work section 55 and a second work section 56. Between the work sections 55, 56 an opening 65 is provided for receiving the A&R member 26. The work station may also comprise one or more work sections 55, 56. The work station 60 comprises a work floor 61. The shown work floor 61 comprises a grating, but other types of work floors may be used. The work station 60 further comprises a safety railing 63 which prevents that a person falls off the work floor 61.

The A&R member 26 is movable relative to the work station 60. At the under side 57 thereof, the workstation 60 comprises guiding means 64 to ensure a smooth positioning of the A&R member 26 in the opening 65. The work station 26 can for example be used for preparation work, maintenance or may provide access for assistance during the execution of work procedures.

The work station 60 may be (partly) integrated in the A&R member 26. In said situation, the (integrated part of) the work station 60 may be moved together with the A&R member 26.

Figure 20:
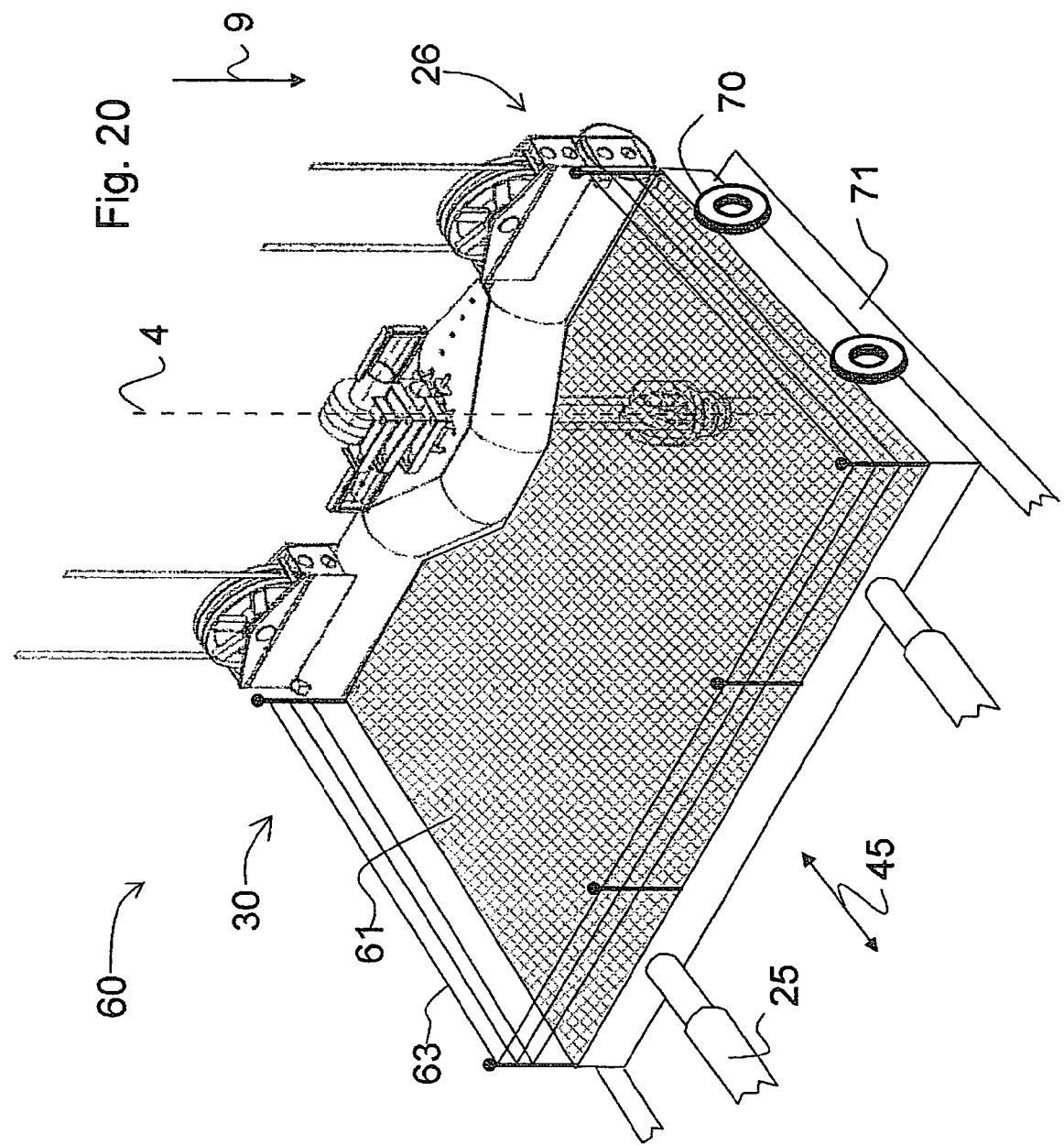
FIG. 20 shows schematically a perspective view of a further embodiment of a work station according to the invention.

FIG. 20 shows a further embodiment of the work station 60. Said work station may be moved by positioning means 25 in the directions of arrow 45. The shown work station 60 is positioned in the work position 30 thereof. In said work position 30 the work station 60 is positioned adjacent to the firing line 4. The positioning means are configured to move the work station away from the firing line (arrow 45) such that the work station is positioned at a larger distance from the firing line 4 in a non-work position. The work station 60 is guided along a track 71 with rollers 70. Other guiding means may be used.

It will be clear to the person skilled in the art that many modifications of the vessel, method, use of the vessel, A&R system and use of the A&R system according the invention are possible without departing from the scope of protection as defined in the claims.

The following embodiments or aspects of the invention may be combined in any fashion and combination and be within the scope of the present invention, as follows:

Embodiment 1.: Vessel for laying a pipeline, comprising
a tower which comprises a firing line and is connected to the vessel by a hinge assembly comprising a tower pivot axis, wherein:
the tower is pivotable relative to the vessel about the tower pivot axis, during pipelaying the tower comprises an upper end and a lower end and the pipeline moves relative to the vessel along the firing line in a laying direction from the upper end towards the lower end, and the tower pivot axis is located at a distance D1 from said upper end as viewed in the laying direction, an A&R system for abandoning and recovering the pipeline, wherein:

the A&R system comprises at least one A&R line for lowering and raising an A&R member configured to be connected to the pipeline, and the at least one A&R line is supported by the hinge assembly and/or by the tower at a distance of at least ⅘ D1 from said upper end as viewed in the laying direction.

Embodiment 2.: Vessel according to embodiment 1, wherein the at least one A&R line is supported by the hinge assembly and/or by the tower at a distance of at least 9/10 D1 from said upper end as viewed in the laying direction.

Embodiment 3.: Vessel according to embodiment 1 or 2, wherein the at least one A&R line is supported by the hinge assembly and/or by the tower at a distance of at least D1 from said upper end as viewed in the laying direction.

Embodiment 4.: Vessel according to any of the preceding embodiments, wherein the at least one A&R line is supported by the hinge assembly and/or by the tower at a distance of D1 from said upper end as viewed in the laying direction.

Embodiment 5.: Vessel according to any of the preceding embodiments, wherein the distance between the upper end and the lower end as viewed in the laying direction is D2 and the at least one A&R line is supported by the hinge assembly and/or by the tower at a distance of less then or equal to D2 as viewed in the laying direction.

Embodiment 6.: Vessel according to any of the preceding embodiments, wherein the at least one A&R line is supported by the tower pivot axis.

Embodiment 7.: Vessel according to any of the preceding embodiments, wherein the at least one A&R line is supported by the hinge assembly and/or by the tower via at least one disc shaped member.

Embodiment 8.: Vessel according to embodiment 7, wherein the at least one disc shaped member is connected to the tower pivot axis.

Embodiment 9.: Vessel according to embodiment 8, wherein the at least one disc shaped member is rotatable about the tower pivot axis.

Embodiment 10.: Vessel according to any of the embodiments 7-9, wherein a tangent line of the circumference of the at least one disc shaped member extends substantially parallel to the firing line.

Embodiment 11.: Vessel according to any of the preceding embodiments, wherein the at least one A&R line is only supported by the hinge assembly.

Embodiment 12.: Vessel according to any of the embodiments 1-10, wherein the at least one A&R line is only supported by the tower.

Embodiment 13.: Vessel according to any of the preceding embodiments, wherein the at least one A&R line is connected the vessel by a first connection wherein the at least one A&R line is not connected to the hinge assembly and/or the tower and a second connection wherein the at least one A&R line is connected to the hinge assembly and/or the tower, and the at least one A&R line extending from the first connection, via the second connection to the A&R member is only single reeved.

Embodiment 14.: Vessel according to any of the preceding embodiments, wherein the at least one A&R line is connected the vessel by a first connection wherein the at least one A&R line is not connected to the hinge assembly and/or the tower and a second connection wherein the at least one A&R line is connected to the hinge assembly and/or the tower, and the at least one A&R line extending from the first connection, via the second connection to the A&R member does not extend towards the upper end of the tower, as viewed in the laying direction.

Embodiment 15.: Vessel according to embodiment 13 or 14, wherein the at least one A&R line is reeved such that during an abandonment operation, the at least one A&R line extending from the first connection, via the second connection to the A&R member does not move towards the upper end of the tower, as viewed in the laying direction.

Embodiment 16.: Vessel according to any of the embodiments 13-15, wherein the at least one A&R line is reeved such that during a recovery operation, the at least one A&R line extending from the first connection, via the second connection to the A&R member does not move towards the lower end of the tower, as viewed in the laying direction.

Embodiment 17.: Vessel according to any of the preceding embodiments, wherein the A&R member is configured to be connected to the pipeline at a distance of at least ⅘ D1, preferably at least 9/10 D1, and more preferably at least D1, from the upper end, as viewed in the laying direction.

Embodiment 18.: Vessel according to any of the preceding embodiments, wherein the tower comprises hang off means for suspending the pipeline from the vessel, and the A&R member is configured to be connected to the pipeline in a position at or past the hang-off means, as viewed in the laying direction.

Embodiment 19.: Vessel according to embodiment 18, wherein the A&R member is configured to be connected to the pipeline only in a position at the hang off means and the A&R system and hang off means are integrated.

Embodiment 20.: Vessel according to embodiment 18, wherein the A&R member is configured to be connected to the pipeline only in a position past the hang off means, as viewed in said laying direction.

Embodiment 21.: Vessel according to any of the preceding embodiments, wherein the A&R member in use is movable in the laying direction and to a seabed.

Embodiment 22.: Vessel according to any of the preceding embodiments, wherein the A&R member is movable in the laying direction over at least 1000 meter, preferably at least 3000 meter.

Embodiment 23.: Vessel according to any of the preceding embodiments, wherein the A&R system is configured to abandon and recover the pipeline by the at least one A&R line such that the A&R member is connected to the vessel via two spaced connection points by at least two spaced A&R line parts.

Embodiment 24.: Vessel according to embodiment 23, wherein the distance between the outer two of the at least two A&R line parts is substantially between 4 m and 30 m, preferably between 10 m and 22 m.

Embodiment 25.: Vessel according to embodiment 23 or 24, wherein the distance between the connection points is between the 4 m and 30 m, preferably between 10 m and 22 m.

Embodiment 26.: Vessel according to any of the preceding embodiments, wherein the A&R member comprises an elongated body which in use extends transverse, preferably substantially perpendicular, to the laying direction.

Embodiment 27.: Vessel according to any of the preceding embodiments, wherein the A&R member comprises a length of substantially between 4 m and 30 m, preferably between 10 and 22 m.

Embodiment 28.: Vessel according to any of the preceding embodiments, wherein the A&R member comprises a mass of substantially between 50.000 kg and 200.000 kg, preferably between 100.000 kg and 150.000 kg.

Embodiment 29.: Vessel according to any of the preceding embodiments, wherein the vessel comprises positioning means for positioning the A&R member substantially in the firing line.

Embodiment 30.: Vessel according to embodiment 29, wherein the positioning means are configured to move the A&R member between an A&R position in which the A&R member is positioned substantially in the firing line and a non-A&R position in which the A&R member is positioned at a distance from firing line.

Embodiment 31.: Vessel according to any of the preceding embodiments, wherein the vessel comprises a work station and positioning means for moving the work station between a work position in which the work station is positioned substantially in or adjacent to the firing line and a non-work position in which the work station is positioned at a distance from the firing line.

Embodiment 32.: Vessel according to any of the preceding embodiments, wherein the vessel comprises a work station and said work station is at least partly integrated with the A&R member.

Embodiment 33.: Vessel according to any of the preceding embodiments, wherein the vessel comprises a connecting member for connecting the A&R member to the pipeline, said connecting member comprises an endless body which is flexible and buoyant.

Embodiment 34.: Vessel according to embodiment 33, wherein the connecting member comprises reinforced fibre material.

Embodiment 35.: Vessel according to embodiment 33 or 34, wherein the connecting member is twistable.

Embodiment 36.: Method for abandoning and/or recovering a pipeline from a pipe laying vessel comprising a tower which comprises a firing line, an upper end, a lower end, and is connected to the vessel by a hinge assembly comprising a tower pivot axis, and an A&R system for abandoning and recovering the pipeline, wherein the A&R system comprises at least one A&R line for lowering and raising an A&R member configured to be connected to the pipeline, said method comprising the steps of:

laying a pipeline such that said pipeline moves relative to the vessel along the firing line and in a laying direction from the upper end towards the lower end, supporting the tower by the hinge assembly such that the tower pivot axis is located at a distance D1 as viewed in the laying direction, abandoning and/or recovering the pipeline with the A&R system, supporting the at least one A&R line by the hinge assembly and/or by the tower at a distance of at least 4/5 D1 from said upper end as viewed in the laying direction.

Embodiment 37.: Method according to embodiment 36, comprising supporting the at least one A&R line by the hinge assembly and/or by the tower at a distance of at least 9/10 D1 from said upper end as viewed in the laying direction.

Embodiment 38.: Method according to embodiment 36 or 37, comprising supporting the at least one A&R line by the hinge assembly and/or by the tower at a distance of at least D1 from said upper end as viewed in the laying direction.

Embodiment 39.: Method according to any of the embodiments 36-38, comprising supporting the at least one A&R line by the hinge assembly and/or by the tower at a distance of D1 from said upper end as viewed in the laying direction.

Embodiment 40.: Method according to any of the embodiments 36-39, wherein the distance between the upper end and the lower end as viewed in the laying direction is D2 and the at least one A&R line is supported by the hinge assembly and/or by the tower at a distance of less or equal to D2 as viewed in the laying direction.

Embodiment 41.: Method according to any of the embodiments 36-40, comprising supporting the at least one A&R line by the tower pivot axis.

Embodiment 42.: Method according to any of the embodiments 36-41, comprising supporting the at least one A&R line by the hinge assembly and/or by the tower via at least one disc shaped member.

Embodiment 43.: Method according to embodiment 42, wherein the at least one disc shaped member is connected to the tower pivot axis.

Embodiment 44.: Method according to embodiment 42 or 43, wherein the at least one disc shaped member is rotatable about the tower pivot axis.

Embodiment 45.: Method according to any of the embodiments 42-44, wherein a tangent line of the circumference of the at least one disc shaped member extends substantially parallel to the firing line.

Embodiment 46.: Method according to any of the embodiments 36-45, comprising supporting the at least one A&R line only by the hinge assembly.

Embodiment 47.: Method according to any of the embodiments 36-45, comprising supporting the at least one A&R line only by the tower.

Embodiment 48.: Method according to any of the embodiments 36-48, wherein the at least one A&R line is connected to the vessel by a first connection wherein the at least one A&R line is not connected to the hinge assembly and/or the tower and a second connection wherein the at least one A&R line is connected to the hinge assembly and/or the tower, and the at least one A&R line extending from the first connection, via the second connection to the A&R member is only single reeved.

Embodiment 49.: Method according to any of the embodiments 36-48, wherein the at least one A&R line is connected to the vessel via a first connection wherein the at least one A&R line is not connected to the hinge assembly and/or the tower and a second connection wherein the at least one A&R line is connected to the hinge assembly and/or the tower, and the at least one A&R line extending from the first connection, via the second connection to the A&R member does not extend towards the upper end of the tower, as viewed in the laying direction.

Embodiment 50.: Method according to embodiment 48 or 49, comprising wherein the at least one A&R line is reeved such that during an abandonment operation, the at least one A&R line extending from the first connection, via the second connection to the A&R member does not move towards the upper end of the tower, as viewed in the laying direction.

Embodiment 51.: Method according to any of the embodiments 48-50, wherein the at least one A&R line is reeved such that during a recovery operation, the at least one A&R line extending from the first connection, via the second connection to the A&R member does not move towards the lower end of the tower, as viewed in the laying direction.

Embodiment 52.: Method according to any of the embodiments 36-52, comprising connecting the A&R member to the pipeline at a distance of at least ⅘ D1, preferably at least 9/10 D1, and more preferably at least D1, from the upper end, as viewed in the laying direction.

Embodiment 53.: Method according to any of the embodiments 36-52, wherein the tower comprises hang off means for suspending the pipeline from the vessel, and the A&R member is connected to the pipeline in a position at or past the hang-off means, as viewed in the laying direction.

Embodiment 54.: Method according to embodiment 53, comprising connecting the A&R member to the pipeline only in a position at the hang off means and the A&R system and hang off means are integrated.

Embodiment 55.: Method according to embodiment 53, comprising, connecting the A&R member to the pipeline only in a position past the hang off means, as viewed in said laying direction.

Embodiment 56.: Method according to any of the embodiments 36-55, comprising moving the A&R member in the laying direction and to a seabed.

Embodiment 57.: Method according to any of the embodiments 36-56, comprising moving the A&R member in the laying direction over at least 1000 meter, preferably at least 3000 meter.

Embodiment 58.: Method according to any of the embodiments 36-57, comprising performing an abandonment and/or recovery operation of the pipeline by the at least one A&R line such that the A&R member is connected to the vessel via two spaced connection points by at least two spaced A&R line parts.

Embodiment 59.: Method according to embodiment 58, wherein the distance between the outer two of the at least two A&R line parts is substantially between 4 m and 30 m, preferably between 10 m and 22 m.

Embodiment 60.: Method according to embodiment 58 or 59, comprising wherein the distance between the connection points is between the 4 m and 30 m, preferably between 10 m and 22 m.

Embodiment 61.: Method according to any of the embodiments 36-60, wherein the A&R member comprises an elongated body which in use extends transverse, preferably substantially perpendicular, to the laying direction.

Embodiment 62.: Method according to any of the embodiments 36-61, wherein the A&R member comprises a length of substantially between 4 m and 30 m, preferably between 10 and 22 m.

Embodiment 63.: Method according to any of the embodiments 36-63, wherein the A&R member comprises a mass of substantially between 50.000 kg and 200.000 kg, preferably between 100.000 kg and 150.000 kg.

Embodiment 64.: Method according to any of the embodiments 36-63, comprising positioning the A&R member substantially in the firing line.

Embodiment 65.: Method according to any of the embodiments 36-64, comprising moving the A&R member between
an A&R position in which the A&R member is positioned substantially in the firing line and
a non-A&R position in which the A&R member is positioned at a distance from firing line.

Embodiment 66.: Method according to any of the embodiments 36-65, comprising moving a work station between
a work position in which the work station is positioned substantially in or adjacent of the firing line and
a non-work position in which the work station is positioned at a distance from the firing line.

Embodiment 67.: Method according to any of the embodiments 36-66, wherein the vessel comprises a work station and said work station is at least partly integrated with the A&R member.

Embodiment 68.: Method according to any of the embodiments 36-67, comprising connecting the A&R member to the pipeline by a connecting member comprising an endless body which is flexible and buoyant.

Embodiment 69.: Method according to embodiment 68, wherein the connecting member comprises reinforced fibre material.

Embodiment 70.: Method according to embodiment 68 or 69, comprising wherein the connecting member is twistable.

Embodiment 71.: Vessel for laying a pipeline, comprising
a tower which comprises a firing line and is connected to the vessel by a hinge assembly comprising a tower pivot axis, wherein:
the tower is pivotable relative to the vessel about the tower pivot axis,
during pipelaying the tower comprises an upper end and a lower end and the pipeline moves relative to the vessel along the firing line in a laying direction from the upper end towards the lower end, and
an A&R system for abandoning and recovering the pipeline, wherein:
the A&R system comprises at least one A&R line for lowering and raising an A&R member configured to be connected to the pipeline, and the at least one A&R line is supported by the hinge assembly.

Embodiment 72.: Vessel according to embodiment 71, wherein the at least one A&R line is supported by only the hinge assembly.

Embodiment 73.: Vessel for laying a pipeline, comprising
a tower which comprises a firing line and is connected to the vessel by a hinge assembly comprising a tower pivot axis, wherein:
the tower is pivotable relative to the vessel about the tower pivot axis,
during pipelaying the tower comprises an upper end and a lower end and the pipeline moves relative to the vessel along the firing line in a laying direction from the upper end towards the lower end,
an A&R system for abandoning and recovering the pipeline, wherein:
the A&R system comprises at least one A&R line for lowering and raising an A&R member configured to be connected to the pipeline,
the at least one A&R line is connected to the vessel by a first connection wherein the at least one A&R line is not connected to the hinge assembly and/or the tower and
a second connection wherein the at least one A&R line is connected to the hinge assembly and/or the tower, and
the at least one A&R line extending from the first connection, via the second connection to the A&R member is only single reeved.

Embodiment 74.: Vessel for laying a pipeline, comprising
a tower which comprises a firing line and is connected to the vessel by a hinge assembly comprising a tower pivot axis, wherein:
the tower is pivotable relative to the vessel about the tower pivot axis,
during pipelaying the tower comprises an upper end and a lower end and the pipeline moves relative to the vessel along the firing line in a laying direction from the upper end towards the lower end, an A&R system for abandoning and recovering the pipeline, wherein:
the A&R system comprises at least one A&R line for lowering and raising an A&R member configured to be connected to the pipeline,
the at least one A&R line is connected to the vessel by a first connection wherein the at least one A&R line is not connected to the hinge assembly and/or the tower and
a second connection wherein the at least one A&R line is connected to the hinge assembly and/or the tower, and,
the at least one A&R line extending from the first connection, via the second connection to the A&R member does not extend towards the upper end of the tower, as viewed in the laying direction.

Embodiment 75.: Vessel for laying a pipeline, comprising
a tower comprising a firing line, wherein during pipelaying the pipeline moves relative to the vessel along said firing line in a laying direction,
a hang off means for suspending the pipeline from the vessel,
an A&R system for abandoning and recovering the pipeline, wherein said A&R system comprises an A&R member configured to be connected to the pipeline in a position at or past the hang-off means, as viewed in the laying direction.

Embodiment 76.: Method for abandoning and/or recovering a pipeline from a pipe laying vessel comprising
a tower which comprises a firing line, an upper end, a lower end, and is connected to the vessel by a hinge assembly comprising a tower pivot axis, and
an A&R system for abandoning and recovering the pipeline, wherein the A&R system comprises at least one A&R line for lowering and raising an A&R member configured to be connected to the pipeline,
said method comprising the steps of:
laying a pipeline such that said pipeline moves relative to the vessel along the firing line and in a laying direction from the upper end towards the lower end,
abandoning and/or recovering the pipeline with the A&R system,
supporting the at least one A&R line by the hinge assembly.

Embodiment 77.: Method according embodiment 76, comprising supporting the at least one A&R line only by the hinge assembly.

Embodiment 78.: Method for abandoning and/or recovering a pipeline from a pipe laying vessel comprising
a tower which comprises a firing line, an upper end, a lower end, and is connected to the vessel by a hinge assembly comprising a tower pivot axis, and
an A&R system for abandoning and recovering the pipeline, wherein the A&R system comprises at least one A&R line for lowering and raising an A&R member configured to be connected to the pipeline, said method comprising the steps of:
laying a pipeline such that said pipeline moves relative to the vessel along the firing line and in a laying direction from the upper end towards the lower end,
abandoning and/or recovering the pipeline with the A&R system, wherein
the at least one A&R line is connected to the vessel by a first connection wherein the at least one A&R line is not connected to the hinge assembly and/or the tower and
a second connection wherein the at least one A&R line is connected to the hinge assembly and/or the tower, and
the at least one A&R line extending from the first connection, via the second connection to the A&R member is only single reeved.

Embodiment 79.: Method for abandoning and/or recovering a pipeline from a pipe laying vessel comprising
a tower which comprises a firing line, an upper end, a lower end, and is connected to the vessel by a hinge assembly comprising a tower pivot axis, and
an A&R system for abandoning and recovering the pipeline, wherein the A&R system comprises at least one A&R line for lowering and raising an A&R member configured to be connected to the pipeline, said method comprising the steps of:
laying a pipeline such that said pipeline moves relative to the vessel along the firing line and in a laying direction from the upper end towards the lower end,
abandoning and/or recovering the pipeline with the A&R system, wherein
the at least one A&R line is connected to the vessel by a first connection wherein the at least one A&R line is not connected to the hinge assembly and/or the tower and
a second connection wherein the at least one A&R line is connected to the hinge assembly and/or the tower, and
the at least one A&R line extending from the first connection, via the second connection to the A&R member does not extend towards the upper end of the tower, as viewed in the laying direction.

Embodiment 80.: Method for abandoning and/or recovering a pipeline from a pipe laying vessel comprising a tower comprising a firing line, said method comprising the steps of:
laying a pipeline such that said pipeline moves relative to the vessel along the firing line and in a laying direction,
suspending the pipeline from the vessel with a hang off means, and
connecting an A&R member of an A&R system to the pipeline in a position at or past the hang off means, as viewed in said laying direction.

Embodiment 81.: Use of the vessel according to any of the embodiments 1-36 and 71-75.

Embodiment 82.: A&R system for use in a vessel according to any of the embodiments 1-36 and 71-75.

Embodiment 83.: Use of the A&R system according to embodiment 82.

The invention claimed is:
1. A vessel for laying a pipeline, comprising
a tower which comprises a firing line and is connected to the vessel by a hinge assembly comprising a tower pivot axis, wherein:
the tower is pivotable relative to the vessel about the tower pivot axis,
during pipelaying the tower comprises an upper end and a lower end and the pipeline moves relative to the vessel along the firing line in a laying direction from the upper end towards the lower end, and
the tower pivot axis is located at a distance D1 from said upper end as viewed in the laying direction,
an abandonment and recovery system for abandoning and recovering the pipeline, wherein:
the abandonment and recovery system comprises at least one abandonment and recovery line for lowering and raising an abandonment and recovery member configured to be connected to the pipeline, and
the at least one abandonment and recovery line is supported by the tower pivot axis of the hinge assembly at the distance D1 from said upper end as viewed in the laying direction.

2. The vessel according to claim 1, wherein the at least one abandonment and recovery line is supported by the hinge assembly via at least one disc shaped member.

3. The vessel according to claim 2, wherein the at least one disc shaped member is connected to the tower pivot axis.

4. The vessel according to claim 3, wherein the at least one disc shaped member is rotatable about the tower pivot axis.

5. The vessel according to claim 1, wherein the abandonment and recovery system is configured to abandon and recover the pipeline by the at least one abandonment and recovery line such that the abandonment and recovery member is connected to the vessel via two spaced connection points by at least two spaced abandonment and recovery line parts.

6. The vessel according to claim 1, wherein the abandonment and recovery member comprises an elongated body which in use extends transverse to the laying direction.

7. The vessel according to claim 6, wherein the elongated body which in use extends substantially perpendicular to the laying direction.

8. A method for abandoning and/or recovering a pipeline from a pipe laying vessel comprising
a tower which comprises a firing line, an upper end, a lower end, and is connected to the vessel by a hinge assembly comprising a tower pivot axis, and
an abandonment and recovery system for abandoning and recovering the pipeline, wherein the abandonment and recovery system comprises at least one abandonment and recovery line for lowering and raising an abandonment and recovery member configured to be connected to the pipeline,
said method comprising the steps of:
laying a pipeline such that said pipeline moves relative to the vessel along the firing line and in a laying direction from the upper end towards the lower end,
supporting the tower by the hinge assembly such that the tower pivot axis is located at a distance D1 as viewed in the laying direction,
abandoning and/or recovering the pipeline with the abandonment and recovery system,
supporting the at least one abandonment and recovery line by the tower pivot axis of the hinge assembly at the distance D1 from said upper end as viewed in the laying direction.

9. The method according to claim 8, further comprising:
supporting the at least one abandonment and recovery line by the hinge assembly via at least one disc shaped member.

10. The method according to claim 9, wherein the at least one disc shaped member is connected to the tower pivot axis.

11. The method according to claim 10, wherein the at least one disc shaped member is rotatable about the tower pivot axis.

12. The method according to claim 8, further comprising:
performing an abandonment and/or recovery operation of the pipeline by the at least one abandonment and recovery line such that the abandonment and recovery member is connected to the vessel via two spaced connection points by at least two spaced abandonment and recovery line parts.

13. The method according to claim 8, wherein the abandonment and recovery member further comprises an elongated body which in use extends transverse to the laying direction.

14. The method according to claim 13, wherein the abandonment and recovery member the elongated body which in use extends substantially perpendicular to the laying direction.

* * * * *